(12) United States Patent
Mo

(10) Patent No.: US 12,503,017 B2
(45) Date of Patent: Dec. 23, 2025

(54) CHILD SAFETY SEAT AND SAFETY BELT LIMITING DEVICE

(71) Applicant: WONDERLAND SWITZERLAND AG, Steinhausen (CH)

(72) Inventor: Xiaolong Mo, Guangdang (CN)

(73) Assignee: Wonderland Switzerland AG, Steinhausen (CH)

( * ) Notice: Subject to any disclaimer, the term of this patent is extended or adjusted under 35 U.S.C. 154(b) by 26 days.

(21) Appl. No.: 18/166,703

(22) Filed: Feb. 9, 2023

(65) Prior Publication Data

US 2023/0256873 A1 Aug. 17, 2023

(30) Foreign Application Priority Data

Feb. 11, 2022 (CN) .......................... 202210127862.5

(51) Int. Cl.
*B60N 2/26* (2006.01)
*B60N 2/28* (2006.01)
*B60R 22/02* (2006.01)

(52) U.S. Cl.
CPC ........... *B60N 2/265* (2013.01); *B60N 2/2816* (2023.08); *B60N 2/2818* (2023.08); *B60R 22/024* (2013.01)

(58) Field of Classification Search
CPC .... B60N 2/265; B60N 2/2812; B60N 2/2816; B60N 2/2818; B60R 2022/008; B60R 22/024

See application file for complete search history.

(56) References Cited

U.S. PATENT DOCUMENTS

| | | | | |
|---|---|---|---|---|
| 5,135,257 A | * | 8/1992 | Short | B60R 22/024 |
| | | | | 297/483 |
| 5,178,439 A | | 1/1993 | McCracken | |
| 5,797,654 A | * | 8/1998 | Stroud | B60R 22/024 |
| | | | | 297/483 |
| 5,839,792 A | * | 11/1998 | Baik | B60R 22/024 |
| | | | | 297/483 |
| 6,846,020 B2 | * | 1/2005 | Xu | B60R 22/26 |
| | | | | 280/808 |

(Continued)

FOREIGN PATENT DOCUMENTS

| | | |
|---|---|---|
| CN | 2306915 | 2/1999 |
| CN | 1329551 | 1/2002 |

(Continued)

OTHER PUBLICATIONS

TW Office Action from the related TW Patent Application No. 11221120650, Nov. 9, 2023, 16 sheets.

(Continued)

*Primary Examiner* — Timothy J Brindley
(74) *Attorney, Agent, or Firm* — Fay Kaplun & Marcin, LLP

(57) ABSTRACT

A child safety seat and a safety belt limiting device are disclosed. The child safety seat includes a safety belt limiting device and a seat body. The safety belt limiting device is configured to be attached to the seat body, the safety belt limiting device includes a first engagement portion, and the safety belt limiting device is adapted to detachably engage with a shoulder belt portion of a vehicle-mounted safety belt through the first engagement portion, so as to apply downward traction to the shoulder belt portion.

13 Claims, 19 Drawing Sheets

(56) References Cited

U.S. PATENT DOCUMENTS

| | | | |
|---|---|---|---|
| 9,233,630 B2 * | 1/2016 | Amirault | B60N 2/2806 |
| 9,694,783 B2 | 7/2017 | Haas et al. | |
| 2002/0017808 A1 * | 2/2002 | Kain | B60N 2/2866 |
| | | | 297/250.1 |
| 2014/0152072 A1 | 6/2014 | Sumroy | |
| 2020/0017063 A1 | 1/2020 | Wang | |

FOREIGN PATENT DOCUMENTS

| | | | | |
|---|---|---|---|---|
| CN | 101863237 | | 10/2010 | |
| CN | 204567560 | | 8/2015 | |
| CN | 105034876 A | * | 11/2015 | |
| CN | 104044552 | | 9/2016 | |
| CN | 205632190 | | 10/2016 | |
| CN | 107650857 A | * | 2/2018 | |
| CN | 107696926 A | * | 2/2018 | B60N 2/2812 |
| CN | 208931180 | | 6/2019 | |
| CN | 209381852 | | 9/2019 | |
| CN | 110481394 | | 11/2019 | |
| CN | 110481395 | | 11/2019 | |
| CN | 210234720 | | 4/2020 | |
| CN | 213199607 U | * | 5/2021 | |
| CN | 215663070 | | 1/2022 | |
| CN | 217124741 | | 8/2022 | |
| DE | 202005013609 U1 | * | 7/2006 | B60R 22/024 |
| DE | 202014011176 U1 | * | 6/2018 | B60N 2/26 |
| DE | 202017007283 U1 | * | 9/2020 | |
| EP | 0 066 372 | | 12/1982 | |
| FR | 2674803 A1 | * | 10/1992 | B60R 22/024 |
| FR | 2854364 A1 | * | 11/2004 | B60R 22/024 |
| GB | 2505013 A | * | 2/2014 | |
| KR | 20000054350 A | * | 9/2000 | |
| KR | 20010001410 U | | 1/2001 | |
| KR | 200214480 Y1 | | 2/2001 | |
| KR | 102184101 B1 | * | 11/2020 | |
| KR | 20210085757 A | * | 7/2021 | |
| WO | 8000681 | | 4/1980 | |
| WO | WO-2012129613 A1 | * | 10/2012 | B60N 2/2812 |
| WO | WO-2020262761 A1 | * | 12/2020 | |

OTHER PUBLICATIONS

TW Office Action from the related TW Patent Application No. 113122111, Jan. 14, 2025, 9 sheets.

CN Office Action from the related CN Patent Application No. 202210127862.5 along with the English translation, Jun. 28, 2025, 19 sheets.

* cited by examiner

CHILD SAFETY SEAT AND SAFETY BELT LIMITING DEVICE

CROSS-REFERENCE TO RELATED APPLICATIONS

The present application claims priority to CN patent application No. 2022101278625 filed with China National Intellectual Property Administration on Feb. 11, 2022, the entire contents of which are incorporated herein by reference.

TECHNICAL FIELD

The present disclosure relates to a child safety seat and a safety belt limiting device.

BACKGROUND

When in use, a vehicle-mounted safety belt is clamped with a plug-in buckle on a seat through a belt buckle. The belt buckle divides the vehicle-mounted safety belt into a shoulder belt portion and a waist belt portion. The shoulder belt portion diagonally crosses a passenger's chest and one shoulder, and the waist belt portion laterally crosses the passenger's waist. After a child reaches a certain age and height, the child seated in the child safety seat may be secured through the vehicle-mounted safety belt. The vehicle-mounted safety belt secures the child in the child safety seat on the one hand and fixes the child safety seat to a seat of a vehicle on the other hand.

Since a size of the vehicle-mounted safety belt is designed based on a physical condition of an adult, although the child safety seat can raise the child seated therein to adapt to the size of the vehicle-mounted safety belt, the vehicle-mounted safety belt may still cause injuries to the child when in use. For example, when the vehicle is impacted, the shoulder belt portion attached to a child (especially a relatively thin child) may easily slip upwards, which may cause injuries to the child's neck and face.

SUMMARY

The present disclosure is intended to provide a child safety seat and a safety belt limiting device, so as to solve the above problems existing in the use of the child safety seat in the conventional art.

In an aspect, the present disclosure provides a child safety seat, including a safety belt limiting device and a seat body. The safety belt limiting device is configured to be attached to the seat body, the safety belt limiting device includes a first engagement portion, and the safety belt limiting device is adapted to detachably engage with a shoulder belt portion of a vehicle-mounted safety belt through the first engagement portion, so as to apply downward traction to the shoulder belt portion.

Further, the safety belt limiting device is adapted to detachably engage with both the shoulder belt portion and a waist belt portion of the vehicle-mounted safety belt through the first engagement portion, so as to apply downward traction to the shoulder belt portion and the waist belt portion.

Further, the first engagement portion is a hung clasp or an annular sleeve.

Further, the safety belt limiting device is attached to a side portion of the seat body. The seat body includes a seat portion and a backrest portion, and the side portion of the seat body includes a side portion of the seat portion and a side portion of the backrest portion.

Further, the safety belt limiting device includes a first traction belt, and the first engagement portion is connected to the first traction belt, and the first traction belt is further provided with a second engagement portion. The side portion of the seat body is provided with a connecting member, and the connecting member is detachably connected to the second engagement portion.

Further, one of the second engagement portion and the connecting member is a male connector and the other is a female connector, and the connecting member is mounted on the side portion of the backrest portion through a webbing; and/or the seat body is provided with a first storage bag, the first storage bag being configured to store the connecting member.

Further, side portions on two sides of the seat body are provided with the connecting member, and the second engagement portion is selectively detachably connected to the connecting member on the side portion of one side.

Further, when the safety belt limiting device is in use, the first engagement portion engages with the shoulder belt portion, the first traction belt is tensioned, and an upper angle is formed between an upper part of the shoulder belt portion of the vehicle-mounted safety belt and the first traction belt. The upper angle ranges from 60° to 120°.

Further, the safety belt limiting device includes a second traction belt, the first engagement portion is connected to the second traction belt, and the second traction belt is fixedly connected to the side portion of the seat body.

Further, the seat body is provided with two safety belt limiting devices, the second traction belts of the two safety belt limiting devices are fixedly connected to side portions on two sides of the seat body respectively, and the first engagement portions of the two safety belt limiting devices selectively engage with the shoulder belt portion.

Further, the seat body includes a seat portion and a backrest portion, the middle of the seat portion is provided with a crotch belt mounting portion, and the safety belt limiting device is connected to the crotch belt mounting portion.

Further, the safety belt limiting device includes a third traction belt, the first engagement portion is connected to the third traction belt, and the third traction belt is connected to the crotch belt mounting portion.

Further, the third traction belt is detachably connected to the crotch belt mounting portion.

Further, the seat body further includes a crotch belt connected to the crotch belt mounting portion, the crotch belt is provided with a first fastening device, and the safety belt limiting device detachably engages with the first fastening device.

Further, the safety belt limiting device includes a fourth traction belt, the first engagement portion is connected to the fourth traction belt, the fourth traction belt is provided with a second fastening device, and the second fastening device is configured to be detachably clamped with the first fastening device.

Further, the fourth traction belt has an adjustable length.

Further, the safety belt limiting device is an integrally formed member, the first engagement portion is located at a first end of the safety belt limiting device, and a second end of the safety belt limiting device is provided with a third fastening device configured to be detachably clamped with the first fastening device.

Further, the child safety seat is provided with a storage structure, and the safety belt limiting device is adapted to be accommodated in the storage structure after being removed from the first fastening device.

Further, the storage structure includes a groove arranged on the front of the seat portion or the front of the backrest portion.

Further, the seat portion is further provided with a storage slot adapted to store the first fastening device.

Further, the seat body is provided with a first shoulder belt and a second shoulder belt, the first shoulder belt is provided with a first sub-buckle, the second shoulder belt is provided with a second sub-buckle, and the first sub-buckle and the second sub-buckle are adapted to be detachably clamped with the first fastening device. Two sides of the backrest portion are provided with a first accommodating slot and a second accommodating slot. When the first sub-buckle and the second sub-buckle are clamped with the first fastening device, the safety belt limiting device is adapted to be accommodated in either of the first accommodating slot and the second accommodating slot. When the safety belt limiting device engages with the first fastening device, the first sub-buckle is adapted to be accommodated in the first accommodating slot, and the second sub-buckle is adapted to be accommodated in the second accommodating slot.

Further, the seat body further includes a crotch belt and a crotch belt guard that are connected to the crotch belt mounting portion, and the safety belt limiting device is connected to the crotch belt guard.

Further, the safety belt limiting device is an integrally formed member and fixed to the crotch belt guard.

Further, the safety belt limiting device includes an integrally formed main body, the first engagement portion is located at a first end of the main body, and a second end of the main body is provided with a third engagement portion. The crotch belt guard is provided with a connecting portion, and the connecting portion is detachably connected to the third engagement portion.

Further, the third engagement portion and the connecting portion are magic tapes in coordination with each other; or the third engagement portion and the connecting portion are zippers in coordination with each other; or the third engagement portion and the connecting portion are magnetic members in coordination with each other; or the third engagement portion and the connecting portion are snap fasteners in coordination with each other; or the third engagement portion and the connecting portion are a button and a buttonhole in coordination with each other.

Further, the child safety seat further includes a clamping plate, a slot is arranged in the middle of the clamping plate, and a clamping hole is formed on a wall of the slot. The connecting portion includes two positioning sleeves spaced apart on a back side of the crotch belt guard, two ends of the clamping plate are adapted to be inserted into the two positioning sleeves, and the slots is located between the two positioning sleeves. The third engagement portion includes an elastic arm and a fixture block arranged on the elastic arm, the elastic arm is adapted to be inserted into the slot, and the fixture block is adapted to be clamped with the clamping hole.

Further, the connecting portion includes an accommodating recess inside the crotch belt guard, and the accommodating recess is provided with a top opening. The third engagement portion includes two lugs extending laterally from the main body in opposite directions, widths of the two lugs are greater than a width of the top opening, and the two lugs are adapted to obliquely enter the accommodating recess through the top opening.

In another aspect, the present disclosure provides a safety belt limiting device. The safety belt limiting device is configured to be attached to a seat body of a child safety seat, the safety belt limiting device includes a first engagement portion, and the safety belt limiting device is adapted to detachably engage with a shoulder belt portion of a vehicle-mounted safety belt through the first engagement portion, so as to apply downward traction to the shoulder belt portion.

Further, the safety belt limiting device is adapted to detachably engage with both the shoulder belt portion and a waist belt portion of the vehicle-mounted safety belt through the first engagement portion, so as to apply downward traction to the shoulder belt portion and the waist belt portion.

Further, the safety belt limiting device includes a traction belt, the first engagement portion is connected to one end of the traction belt, and the other end of the traction belt being connected to a side portion of the seat body.

Further, the other end of the traction belt is fixedly connected to the side portion of the seat body; and/or two safety belt limiting devices are provided.

Further, the other end of the traction belt is provided with a second engagement portion, and the second engagement portion is configured to be detachably connected to a connecting member on the side portion of the seat body.

Further, the safety belt limiting device includes a traction belt, the first engagement portion is connected to one end of the traction belt, the other end of the traction belt is further provided with a second fastening device, and the second fastening device is configured to be detachably connected to a first fastening device on a crotch belt of the child safety seat.

Further, the safety belt limiting device includes a traction belt, the first engagement portion is connected to one end of the traction belt, and the other end of the traction belt is configured to be connected to a crotch belt mounting portion of a seat portion of the child safety seat.

Further, when the safety belt limiting device is in use, the first engagement portion engages with the shoulder belt portion, the traction belt is tensioned, and an upper angle is formed between an upper part of the shoulder belt portion of the vehicle-mounted safety belt and the traction belt. The upper angle ranges from 60° to 120°.

Further, the traction belt has an adjustable length; and/or the first engagement portion is a hung clasp or an annular sleeve.

Further, the safety belt limiting device is an integrally formed member, the first engagement portion is located at a first end of the safety belt limiting device, and a second end of the safety belt limiting device is provided with a third fastening device configured to be detachably connected to a first fastening device on a crotch belt of the child safety seat.

Further, the safety belt limiting device includes an integrally formed main body, the first engagement portion is located at a first end of the main body, and a second end of the main body is provided with a third engagement portion. The third engagement portion is a magic tape, or the third engagement portion is a zipper, or the third engagement portion is a magnetic member, or the third engagement portion is a snap fastener, or the third engagement portion is a button, or the third engagement portion includes an elastic arm and a fixture block arranged on the elastic arm, or the third engagement portion includes two lugs extending laterally from the main body in opposite directions.

The child safety seat according to the present disclosure is provided with a safety belt limiting device. The safety belt limiting device detachably engages with the shoulder belt portion of the vehicle-mounted safety belt through the first engagement portion and can apply downward traction to the shoulder belt portion. In this way, upward slippage of the shoulder belt portion can be effectively limited when the vehicle is impacted, thereby effectively preventing injuries to the child's neck and face caused by the shoulder belt portion, and improving the child's riding safety.

DETAILED DESCRIPTION OF THE EMBODIMENTS

Figure 1:
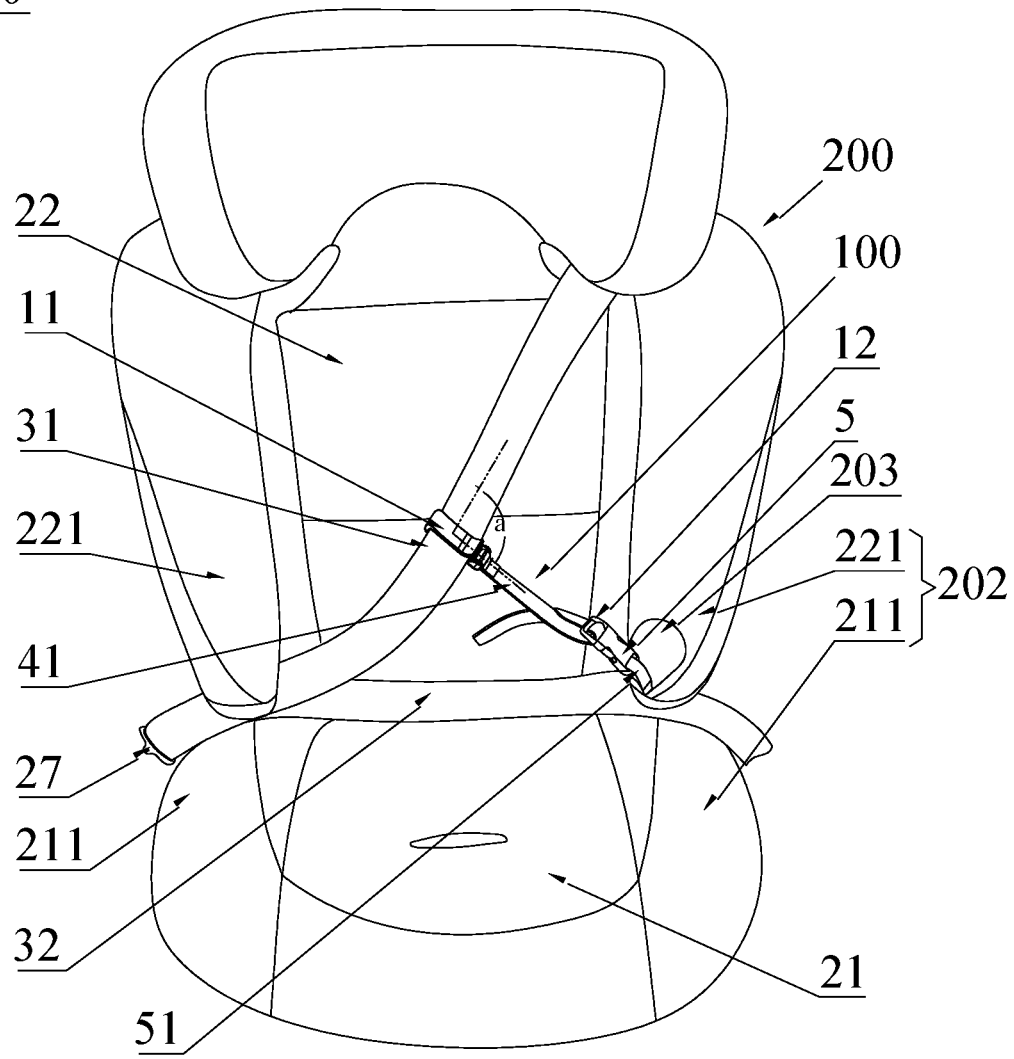
FIG. 1 schematically illustrates a perspective view of a child safety seat according to a first embodiment of the present disclosure.

FIG. 1 illustrates a child safety seat 1000 (hereinafter referred to as a seat 1000) according to a first embodiment of the present disclosure. As shown in the figure, the child safety seat 1000 includes a safety belt limiting device 100 and a seat body 200.

Referring to FIG. 1, the seat body 200 may include a seat portion 21 and a backrest portion 22. The seat portion 21 has two side portions 211 located on left and right sides, and the backrest portion 22 has side portions (also referred to as side wings) 221 located on left and right sides. In this embodiment, the side portions 211 on the two sides of the seat portion 21 and the side portions 221 on the two sides of the backrest portion 22 are collectively referred to as a side portion 202 of the seat body 200. Preferably, the side portions 211 on the two sides of the seat portion 21 may be folded upwards relative to the middle of the seat portion 21, and the side portions 221 on the two sides of the backrest portion 22 may be folded forward relative to the middle of the backrest portion 22. The structures of the seat portion 21 and the backrest portion 22 can better secure a child in the seat 1000.

Referring to FIG. 1, the safety belt limiting device 100 may be directly or indirectly attached to any suitable position of the seat body 200. In this embodiment, the safety belt limiting device 100 may be attached to the side portion 202 of the seat body 200. More specifically, the safety belt limiting device 100 is attached to one side portion 221 of the backrest portion 22. The safety belt limiting device 100 includes a first engagement portion 11. The safety belt limiting device 100 is adapted to detachably engage with a lower middle section of a shoulder belt portion 31 of a vehicle-mounted safety belt through the first engagement portion 11, so as to apply downward traction to the shoulder belt portion 31. In combination with related arts, it can be seen that the vehicle-mounted safety belt has a belt buckle 27. The belt buckle 27 is configured to be clamped with a plug-in buckle on a seat of a vehicle and divide the vehicle-mounted safety belt into the shoulder belt portion 31 and a waist belt portion 32. The shoulder belt portion 31 crosses the child's chest and one shoulder obliquely, and the waist belt portion 32 crosses the child's waist, so as to secure the child in the seat 1000 and fix the seat 1000 to the seat of the vehicle.

With the child safety seat according to this embodiment, when the vehicle is impacted, the safety belt limiting device 100 pulls the shoulder belt portion 31, and applies force towards the waist belt portion 32 to the shoulder belt portion 31, so as to limit upward slippage of an upper section of the shoulder belt portion 31 and prevent injuries to the child's neck and face caused by the shoulder belt portion 31, thereby improving the child's riding safety. It is to be noted that the safety belt limiting device 100 as referred to in the embodiments of the present disclosure applies downward traction to the shoulder belt portion 31. A direction of the traction is not limited to a vertical downward direction. For example, an obliquely downward direction of the traction also falls within the protection scope of the present application. In this embodiment, the safety belt limiting device 100 is configured to apply obliquely downward traction to the shoulder belt portion 31 to keep the shoulder belt portion 31 away from the child's neck and face. It is to be noted that the safety belt limiting device 100 may also detachably engage with both the shoulder belt portion 31 and the waist belt portion 32 of the vehicle-mounted safety belt through the first engagement portion 11, so as to apply downward traction to the shoulder belt portion 31 and the waist belt portion 32 at the same time.

Figure 2:
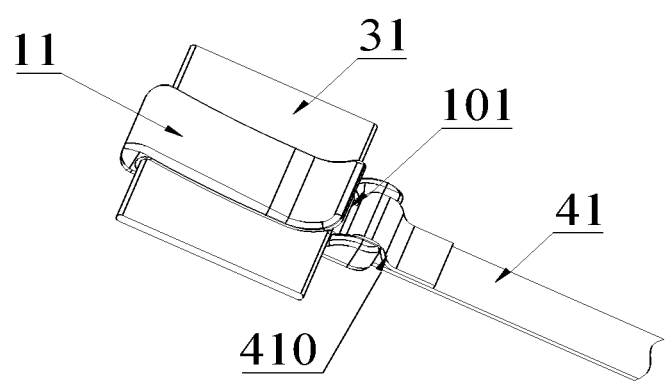
FIG. 2 schematically illustrates a partial perspective view of a safety belt limiting device in the child safety seat according to the first embodiment of the present disclosure.
Figure 3:
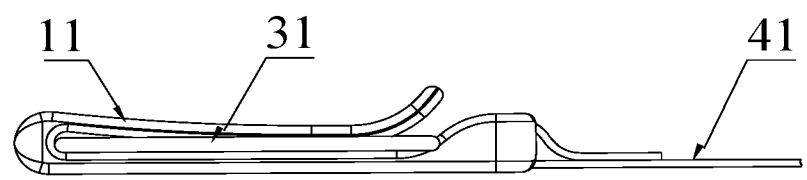
FIG. 3 schematically illustrates a side view of a partial structure of the safety belt limiting device shown in FIG. 2.

Referring to FIG. 1 to FIG. 3, in this embodiment, the safety belt limiting device 100 detachably engages with the shoulder belt portion 31 through the first engagement portion 11, so as not to affect removal of the seat 1000 from the vehicle. After the seat 1000 is removed from the seat of the vehicle, the vehicle-mounted safety belt may be used to secure an adult. In this embodiment, a preferred implementation of the first engagement portion 11 is shown. The first engagement portion 11 is, for example, a U-shaped hung clasp. The hung clasp may hang upside down on the shoulder belt portion 31 to engage with the shoulder belt portion 31. It is easy for the hung clasp to engage with and be removed from the shoulder belt portion 31, and there is no need to make adaptive changes to the structure of the shoulder belt portion 31. It may be understood that the implementation of the first engagement portion 11 is not limited to the hung clasp, provided that detachable engagement with the shoulder belt portion 31 can be realized and the safety belt limiting device 100 can easily apply downward traction to the shoulder belt portion 31. For example, in some non-shown embodiments, the first engagement portion 11 may be an openable and closable annular sleeve, and the shoulder belt portion 31 may pass through the annular sleeve. The annular sleeve may be made of, for example, metal, plastic or cloth. When the annular sleeve is made of cloth, the closure of the annular sleeve may be realized by a button, a magnetic button, a tri-glide button, a zipper, or the like.

Referring to FIG. 1, the safety belt limiting device 100 in this embodiment is detachably connected to the seat body 200. In this way, the safety belt limiting device 100 can be mounted on the seat body 200 or removed from the seat body 200 as required. The safety belt limiting device 100 shown in this embodiment may include a first traction belt 41. The hung clasp as the first engagement portion 11 is connected to the first traction belt 41, and the first traction belt 41 is further provided with a second engagement portion 12. The side portion 221 of the backrest portion 22 is provided with a connecting member 5. The connecting member 5 is detachably connected to the second engagement portion 12. For example, in the second engagement portion 12 and the connecting member 5, one is a male connector and the other is a female connector matching the male connector. The connecting member 5 may be mounted on a lower side of the side portion 221 of the backrest portion 22, for example, through a webbing 51.

Preferably, the first traction belt 41 has an adjustable length. The first traction belt 41 adjusted to an appropriate length may form a stable angle with the shoulder belt portion 31 to ensure a traction effect of the safety belt limiting device 100 on the shoulder belt portion 31. For example, when the child is seated in the seat 100, the vehicle-mounted safety belt and the safety belt limiting device 100 are in use, the first engagement portion 11 engages with the shoulder belt portion 31, the first traction belt 41 is tensioned, and an upper angle α is formed between an upper part of the shoulder belt portion 31 and the tensioned first traction belt 41. The upper angle α may range, for example, from 60° to 120°. The upper angle α may be equal to 60° or equal to 120°. Preferably, the upper angle α is 90°. In this way, the first traction belt 41 can better pull the shoulder belt portion 31, thereby preventing upward slippage of the shoulder belt portion 31.

Referring to FIG. 2, preferably, the hung clasp is provided with a through hole 101, and a first end of the first traction belt 41 passes through the through hole 101 and then forms an annular structure 410 by sewing. Referring to FIG. 1, the second engagement portion 12 may be a male connector including a tri-glide button portion. The first traction belt 41 passes through the tri-glide button portion of the male connector. The length of the first traction belt 41 can be easily adjusted by moving the first traction belt 41 relative to the tri-glide button portion. It may be understood that, in this embodiment, "the first traction belt 41 has an adjustable length" means that a length of the first traction belt 41 between the first engagement portion 11 and the second engagement portion 12 is adjustable.

Referring to FIG. 1, in this embodiment, the connecting member 5 is arranged at the bottom of the side portion 221 of the backrest portion 22, close to an opening of the side portion 221 for the waist belt portion 23 to pass through. Certainly, in other embodiments, the connecting member 5 may be arranged at a junction between the side portion 211 of the seat portion 21 and the side portion 221 of the backrest portion 22, or be arranged on an inner or outer side face of the side portion 221 of the backrest portion 22, etc. In addition, in this embodiment, preferably, the seat body 200 is provided with a first storage bag 203. The first storage bag 203 may be a cloth bag or an elastic sleeve connected to seat cloth of the seat body 200. After the connecting member 5 is separated from the second engagement portion 12, the connecting member 5 may be stored in the first storage bag 203 and hidden. According to the setting position of the connecting member 5 on the seat body 200, the first storage bag 203 may be correspondingly arranged at a suitable position of the seat body 200.

Referring to FIG. 1, although the connecting member 5 is shown only on the side portion 202 on one side of the seat body 200 in this embodiment, in other embodiments, the side portions 202 on two sides of the seat body 200 may be provided with the connecting member 5. The second engagement portion 12 of the safety belt limiting device 100 may be selectively detachably connected to the connecting member 5 on the side portion 202 on either side. In this way, regardless of whether the seat 1000 is mounted on the left or the right of a rear row of the vehicle, the safety belt limiting device 100 can be connected between the shoulder belt portion 31 and the corresponding connecting member 5, so as to apply downward traction to the shoulder belt portion 31, so that the shoulder belt portion 31 is close to the waist belt portion 32, thereby preventing upper slippage of the shoulder belt portion 31.

Figure 4:
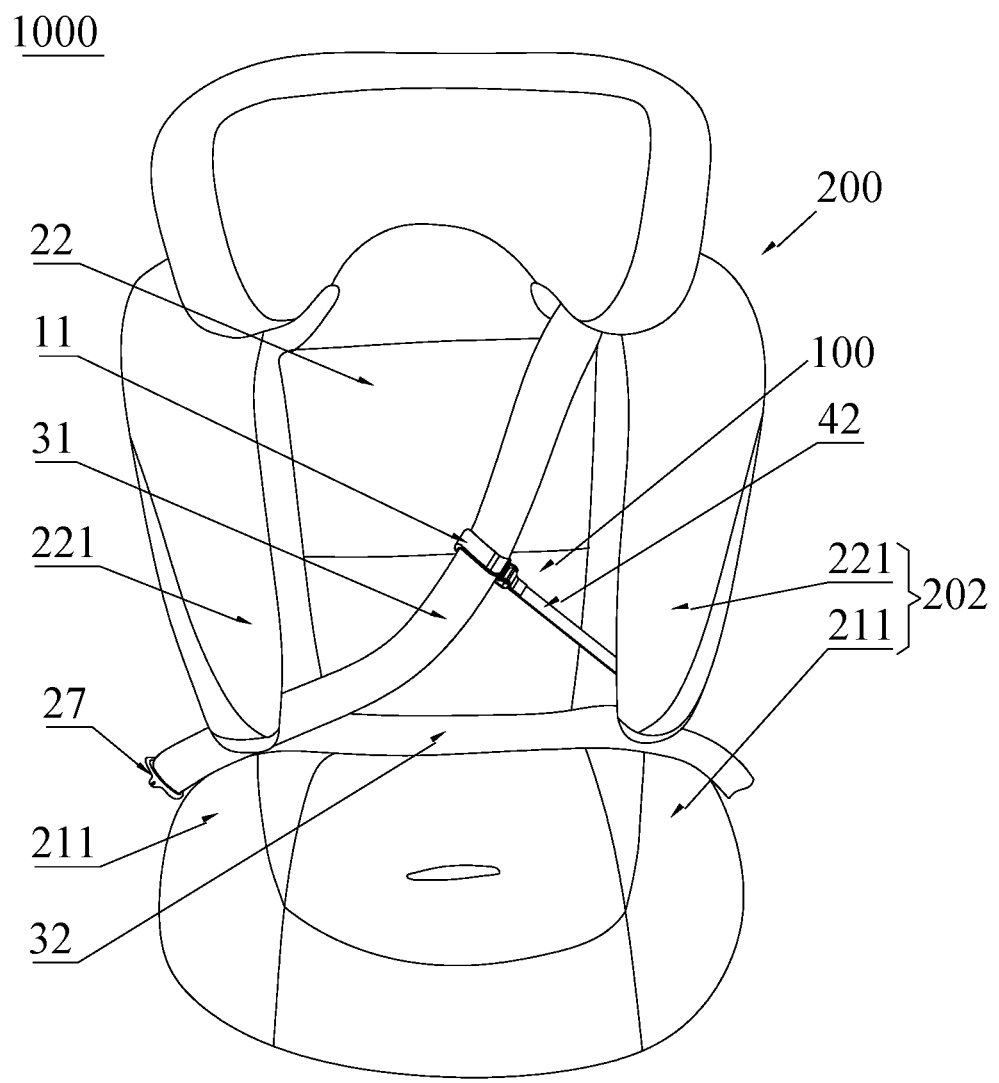
FIG. 4 schematically illustrates a perspective view of a child safety seat according to a second embodiment of the present disclosure.

FIG. 4 illustrates a seat 1000 according to a second embodiment of the present disclosure. The seat 1000 includes a safety belt limiting device 100 and a seat body 200.

The seat body 200 includes a seat portion 21 and a backrest portion 22. Without conflict, the structure of the seat body 200 may be obtained with reference to the description in the first embodiment.

As shown in FIG. 4, the safety belt limiting device 100 includes a first engagement portion 11 and a second traction belt 42. The first engagement portion 11 is connected to the second traction belt 42. A structure of the first engagement portion 11 and a connection relationship with the second traction belt 42 may be obtained with reference to the structure of the first engagement portion 11 and the connection relationship with the first traction belt 41 in the first embodiment. Details are not described herein again.

This embodiment is a variation of the first embodiment, and is mainly different from the first embodiment in that the second traction belt 42 is fixedly connected to the side portion 202 of the seat body 200. More specifically, for example, a second end of the second traction belt 42 is fixedly connected to the seat cloth of the side portion 221 of the backrest portion 22 by sewing. Compared with the first embodiment, the second engagement portion 12 and the connecting member 5 may be omitted in this embodiment, and the safety belt limiting device 100 may still apply downward traction to the shoulder belt portion 31, so that the shoulder belt portion 31 is close to the waist belt portion 32, thereby preventing upward slippage of the shoulder belt portion 31.

In some non-shown embodiments, for example, a tri-glide button portion may be arranged on the hung clasp as the first engagement portion 11, and a first end of the second traction belt 42 passes through the tri-glide button portion. In this way, the length of the second traction belt 42 can be easily adjusted by moving the second traction belt 42 relative to the tri-glide button portion. Preferably, when the vehicle-mounted safety belt and the safety belt limiting device 100 are in use, the upper part of the shoulder belt portion 31 may form an upper angle α with the second traction belt 42 as described in the first embodiment. The upper angle α may range, for example, from 60° to 120°.

In addition, although one safety belt limiting device 100 is shown only on the side portion 202 on one side of the seat body 200 in this embodiment, in other embodiments, the seat body 200 may be provided with two safety belt limiting devices 100. The second traction belts 42 of the two safety belt limiting devices 100 are fixedly connected to the side portions 202 on the two sides of the seat body 200 respectively. The first engagement portions 11 on the second traction belts 42 of the two safety belt limiting devices 100 selectively engage with the shoulder belt portion 31. In this way, regardless of whether the seat 1000 is mounted on the left or the right of the rear row of the vehicle, it can be ensured that one safety belt limiting device 100 is adapted to apply downward traction to the shoulder belt portion 31, so that the shoulder belt portion 31 is close to the waist belt portion 32, thereby preventing upper slippage of the shoulder belt portion 31.

Figure 5:
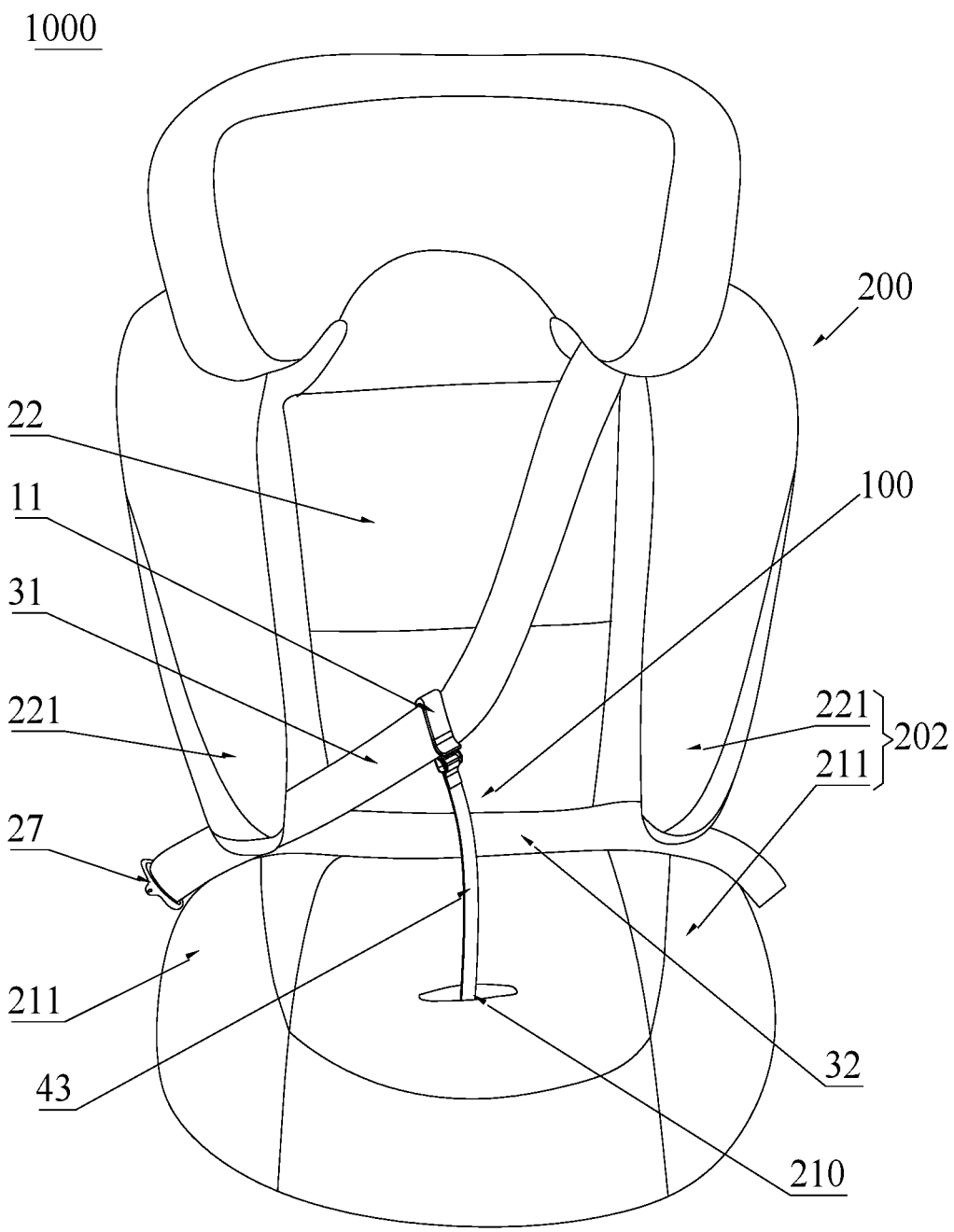
FIG. 5 schematically illustrates a perspective view of a child safety seat according to a third embodiment of the present disclosure.

FIG. 5 illustrates a seat 1000 according to a third embodiment of the present disclosure. The seat 1000 includes a safety belt limiting device 100 and a seat body 200. The seat body 200 includes a seat portion 21 and a backrest portion 22. Without conflict, the structure of the seat body 200 may be obtained with reference to the description in the first embodiment. The safety belt limiting device 100 is attached to the seat body 200 and detachably engages with the shoulder belt portion 31 of the vehicle-mounted safety belt through the first engagement portion 11, so as to apply downward traction to the shoulder belt portion 31, so that the shoulder belt portion 31 is close to the waist belt portion 32, thereby preventing upper slippage of the shoulder belt portion 31. This embodiment is mainly different from the above embodiments in the mounting position of the safety belt limiting device 100.

Referring to FIG. 5, the middle of the seat portion 21 is provided with a crotch belt mounting portion 210. The crotch belt mounting portion 210 is, for example, a part provided by a surface of the seat portion 21 for connecting the crotch belt. The safety belt limiting device 100 may be fixedly or detachably connected to the crotch belt mounting portion 210. Preferably, the safety belt limiting device 100 may further include a third traction belt 43, and the first engagement portion 11 is connected to the third traction belt 43. The third traction belt 43 and the crotch belt mounting portion 210 may be connected together by sewing, for example. The safety belt limiting device 100 of this structure may also function as a crotch belt while applying downward traction to the shoulder belt portion 31. In some embodiments, the crotch belt mounting portion 210 may also be additionally provided with a crotch belt. In combination with the related arts, it can be seen that the crotch belt may engage with two sub-buckles on two shoulder belts of the seat 1000. When the child is secured in the seat 1000 by using the crotch belt and the shoulder belt, the vehicle-mounted safety belt is in an idle state. In this case, the safety belt limiting device 100 can be hidden in the storage structure on the seat portion 21. On the contrary, when the child is secured in the seat 1000 by using the vehicle-mounted safety belt, the safety belt limiting device 100 can be removed from the storage structure to engage with the shoulder belt portion 31, and the crotch belt is in an idle state. In this case, the crotch belt can be hidden in the storage structure.

Referring to FIG. 5, in this embodiment, a structure of the first engagement portion 11 and a connection relationship with the third traction belt 43 may be obtained with reference to the structure of the first engagement portion 11 and the connection relationship with the first traction belt 41 in the first embodiment. Details are not described herein again.

In some non-shown embodiments, the third traction belt 43 has an adjustable length. For example, a tri-glide button portion may be arranged on the hung clasp as the first engagement portion 11, and an end portion of the third traction belt 43 passes through the tri-glide button portion.

The length of the third traction belt 43 can be easily adjusted by moving the third traction belt 43 relative to the tri-glide button portion.

Figure 6:
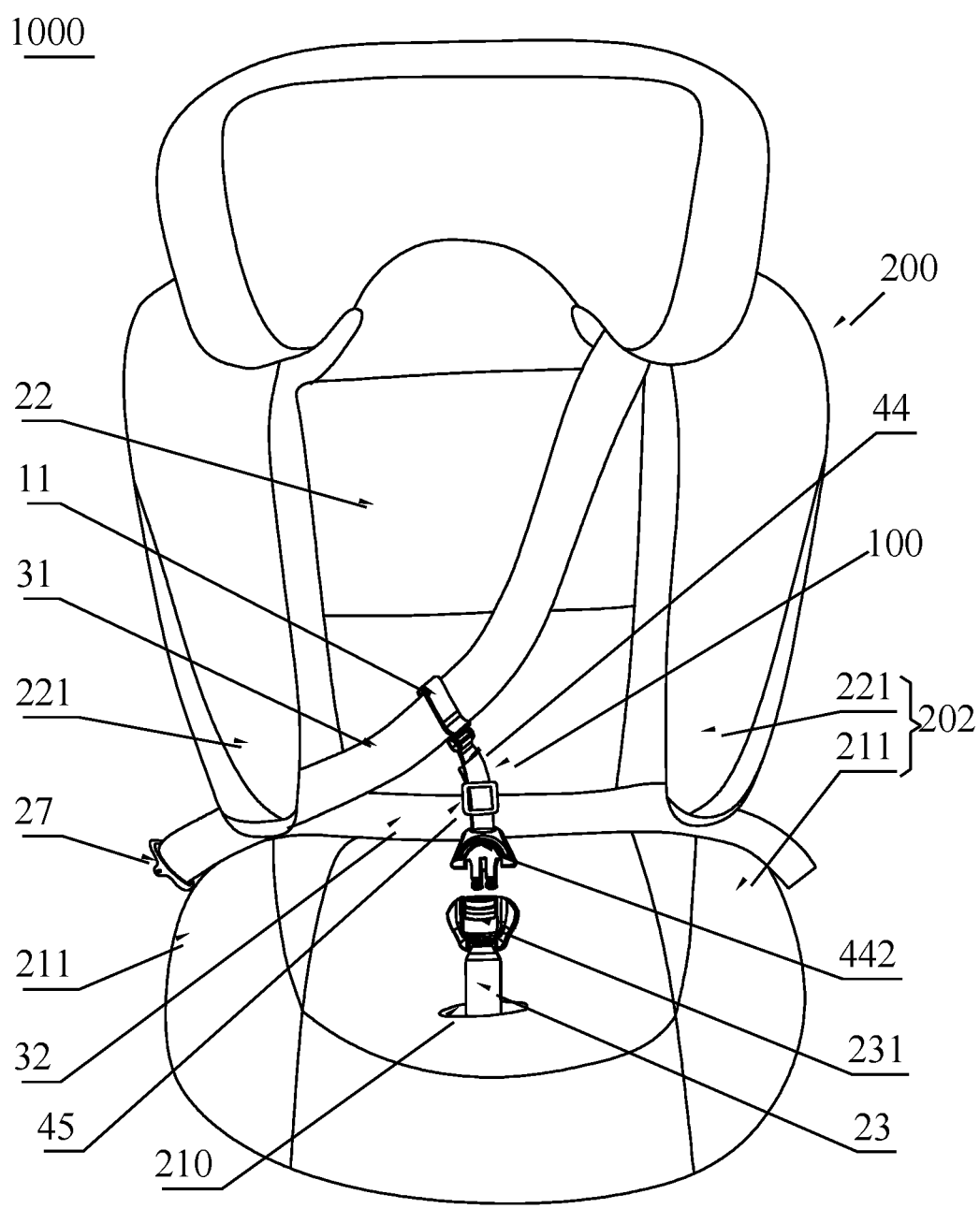
FIG. 6 schematically illustrates a perspective view of a child safety seat according to a fourth embodiment of the present disclosure.

FIG. 6 illustrates a seat 1000 according to a fourth embodiment of the present disclosure. This embodiment is a variation of the third embodiment. Differences between this embodiment and the third embodiment will be mainly described below, and identical or similar content between this embodiment and the third embodiment will not be described in detail.

Referring to FIG. 6, in this embodiment, a crotch belt 23 of the seat 1000 extends from the crotch belt mounting portion 210, and an end portion of the crotch belt 23 is provided with a first fastening device 231. The safety belt limiting device 100 is detachably connected to the first fastening device 231 of the crotch belt 23. In this way, the safety belt limiting device 100 can make use of a length of the crotch belt 23, and a length of the safety belt limiting device 100 can be significantly shortened. Preferably, the safety belt limiting device 100 may include a fourth traction belt 44, the first engagement portion 11 is connected to the fourth traction belt 44, the fourth traction belt 44 is further provided with a second fastening device 442, and the first fastening device 231 is detachably clamped with the second fastening device 442. The first fastening device 231 may be a female buckle, and the second fastening device 442 may be a male buckle. When the child in the seat 1000 is secured using the vehicle-mounted safety belt, firstly, the first fastening device 231 and the second fastening device 442 are buckled together, and then the first engagement portion 11 engages with the shoulder belt portion 31, so that the safety belt limiting device 100 can apply downward traction to the shoulder belt portion 31, making the shoulder belt portion 31 close to the waist belt portion 32, thereby preventing upper slippage of the shoulder belt portion 31. When the child is secured using a child shoulder belt of the seat 1000, the first fastening device 231 can be snapped into a sub-buckle of the child shoulder belt after the clamping relationship between the first fastening device 231 and the second fastening device 442 is released.

Referring to FIG. 6, in this embodiment, the fourth traction belt 44 may pass through a tri-glide button 45. The length of the fourth traction belt 44 can be easily adjusted by moving the fourth traction belt 44 relative to the tri-glide button 45.

FIG. 7 to FIG. 10 illustrate a seat 1000 according to a fifth embodiment of the present disclosure, but seat cloth of the seat 1000 is not illustrated in FIG. 7 to FIG. 10. This embodiment is a variation of the fourth embodiment. Differences between this embodiment and the fourth embodiment will be mainly described below, and identical or similar content between this embodiment and the fourth embodiment will not be described in detail.

Figure 8:
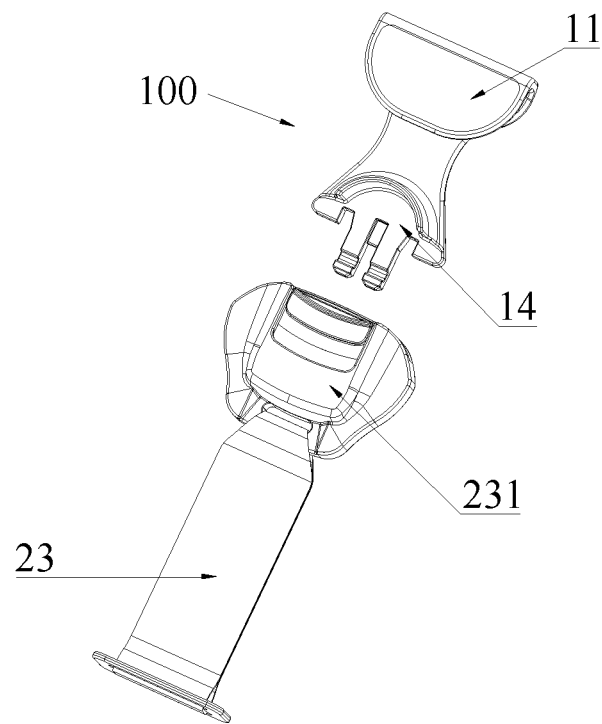
FIG. 8 schematically illustrates a partial perspective view of the child safety seat according to the fifth embodiment of the present disclosure.
Figure 9:
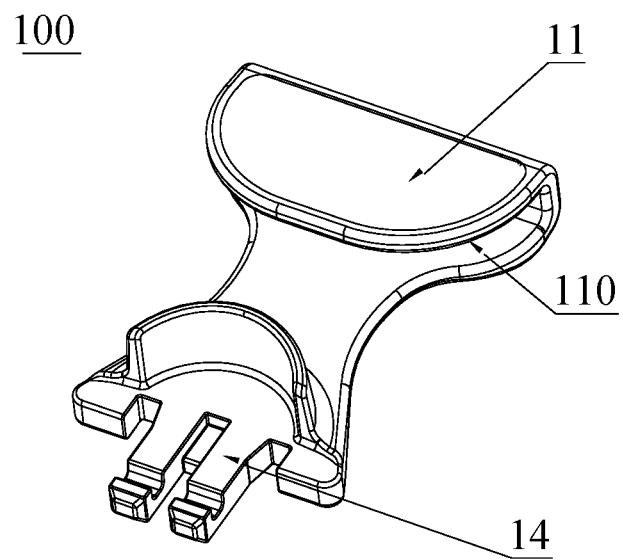
FIG. 9 schematically illustrates a perspective view of the safety belt limiting device in the child safety seat according to the fifth embodiment of the present disclosure.

Referring to FIG. 8 and FIG. 9, in the seat 1000 according to the fifth embodiment of the present disclosure, the safety belt limiting device 100 is an integrally formed member, which is integrally formed, for example, by injection molding. The first engagement portion 11 is located at a first end of the safety belt limiting device 100. The first engagement portion 11 is, for example, a hung clasp with a U-shaped cross section. A second end of the safety belt limiting device 100 is provided with a third fastening device 14. The third fastening device 14 is configured to be detachably clamped with the first fastening device 231.

Figure 7:
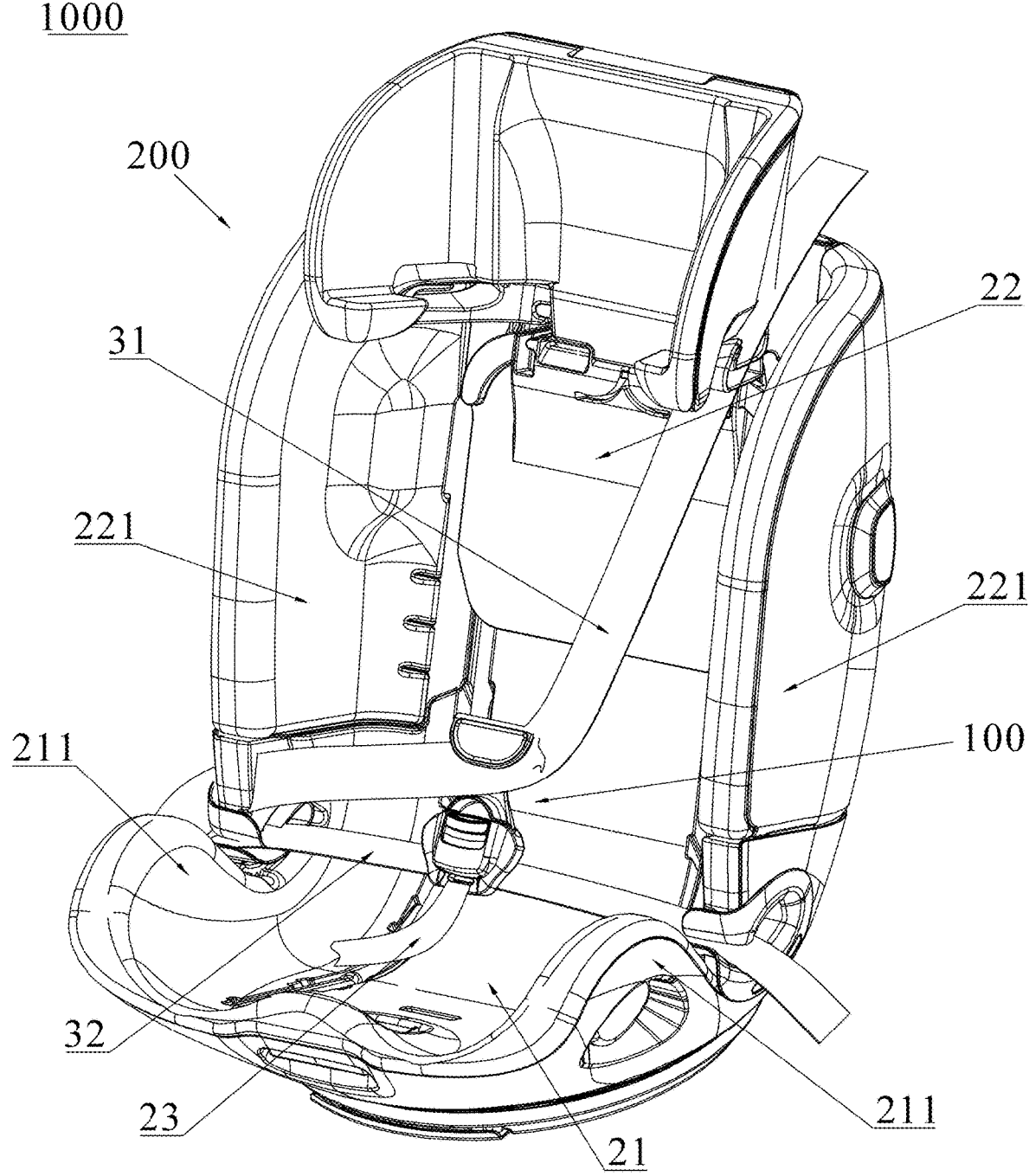
FIG. 7 schematically illustrates a perspective view of a child safety seat according to a fifth embodiment of the present disclosure, in which a safety belt limiting device is in a state of pulling a shoulder belt portion.

Referring to FIG. 7 to FIG. 9, when the safety belt limiting device 100 in this embodiment is in use, the first engagement portion 11 thereof may hang upside down on the shoulder belt portion 31, and the third fastening device 14 may be clamped with the first fastening device 231 of the crotch belt 23, so as to apply downward traction to the shoulder belt portion 31, so that the shoulder belt portion 31 is close to the waist belt portion 32, thereby preventing upper slippage of the shoulder belt portion 31.

The safety belt limiting device 100 in this embodiment may be also provided with no traction belt, and has advantages of a simple structure, easy manufacturing, convenient disassembly and assembly, and the like. The safety belt limiting device 100 has a small volume and is easily stored after removal.

Figure 10:
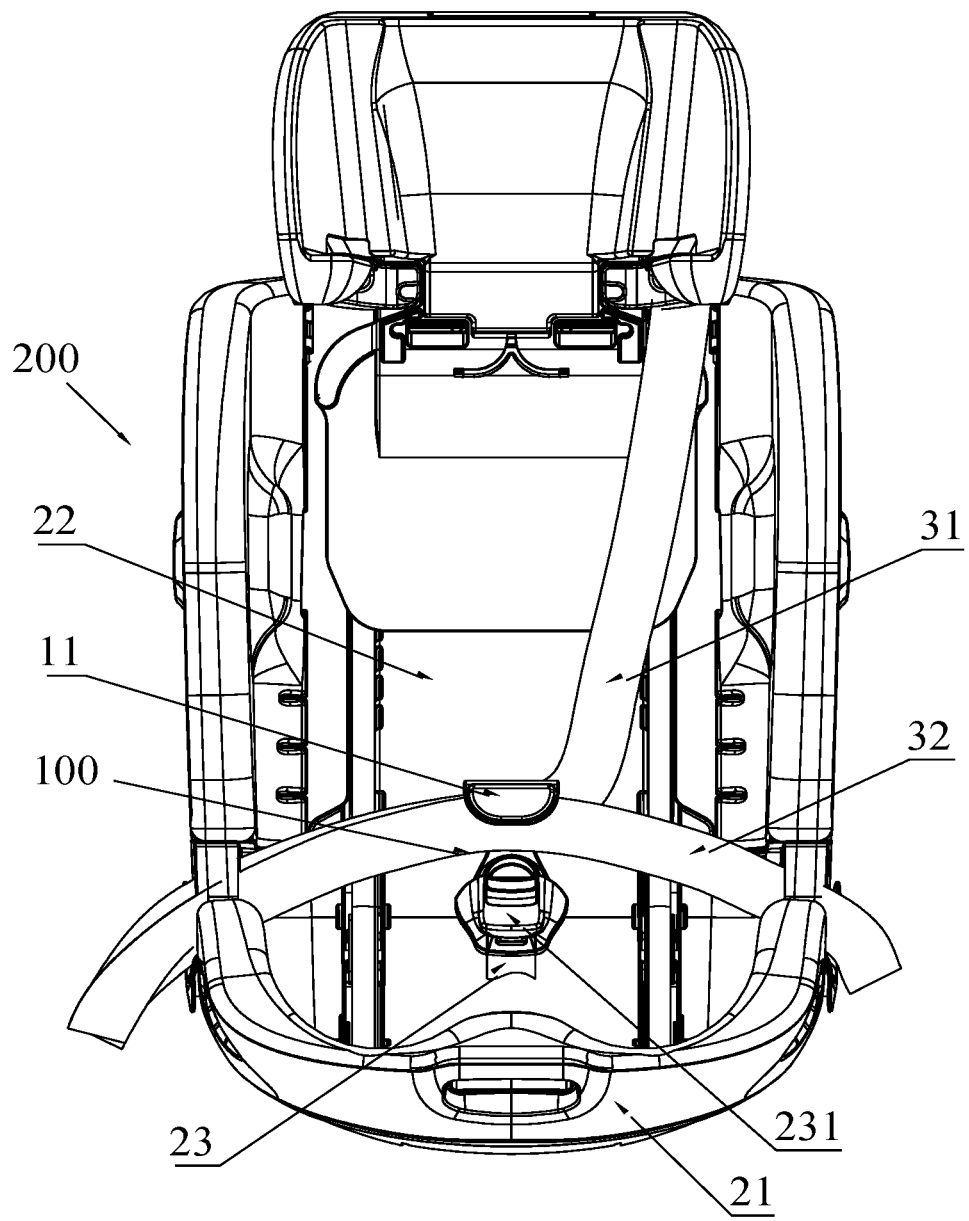
FIG. 10 schematically illustrates another perspective view of the child safety seat according to the fifth embodiment of the present disclosure, in which the safety belt limiting device is in a state of pulling the shoulder belt portion and a waist belt portion at the same time.

Referring to FIG. 10, the first engagement portion 11 of the safety belt limiting device 100 according to this embodiment may be further hung on the shoulder belt portion 31 and the waist belt portion 32 at the same time, so that the middle of the shoulder belt portion 31 is directly attached to the middle of the waist belt portion 32. When the seat 1000 is in use, the safety belt limiting device 100 can apply downward traction to the shoulder belt portion 31 and the waist belt portion 32 at the same time, which can prevent upper slippage of the shoulder belt portion 31 as well as reduce the force on the child's abdomen. It may be understood that the hung clasp as the first engagement portion 11 may have a wider size, so that the recess 110 thereof can accommodate the shoulder belt portion 31 and the waist belt portion 32 at the same time.

Figure 11:
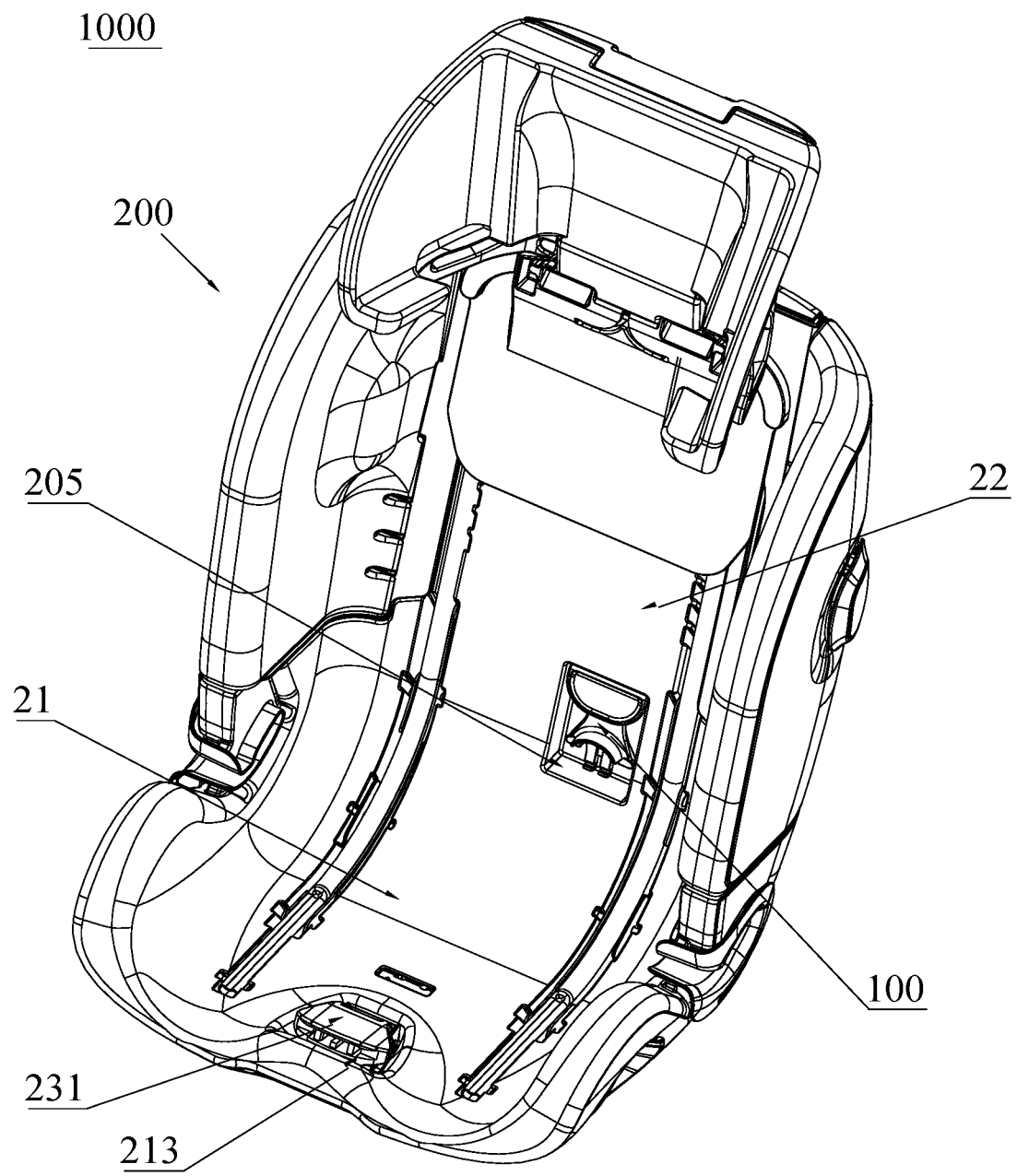
FIG. 11 schematically illustrates a partial perspective view of the child safety seat according to the fifth embodiment of the present disclosure.

Preferably, the seat 1000 may be further provided with a storage structure. The storage structure may be arranged on the seat portion 21 or the backrest portion 22, or may be arranged on a base of the seat 1000. The safety belt limiting device 100 is adapted to be accommodated in the storage structure after being removed from the crotch belt 23, which can effectively prevent loss. Referring to FIG. 11, the storage structure includes, for example, a groove 205 arranged on the front of the seat portion 21 or the front of the backrest portion 22. Seat cloth (not shown in the figure) of the seat body 200 may be provided with a movable cover at a position corresponding to the groove 205. When the movable cover is opened, the safety belt limiting device 100 may be removed from the groove 205 or the safety belt limiting device 100 may be put into the groove 205. When the movable cover is closed, the groove 205 may be covered without affecting beauty of the seat cloth. In addition, in some embodiments, the groove 205 may be directly covered by the seat cloth, and when the seat cloth is lifted from a side, the groove 205 can be exposed, so that the safety belt limiting device 100 can be taken and placed easily. Preferably, the seat portion 21 may be further provided with a storage slot 213 adapted to store the first fastening device 231. The storage slot 213 is arranged close to the crotch belt mounting portion 210, so as to accommodate the first fastening device 231 nearby.

Figure 12:
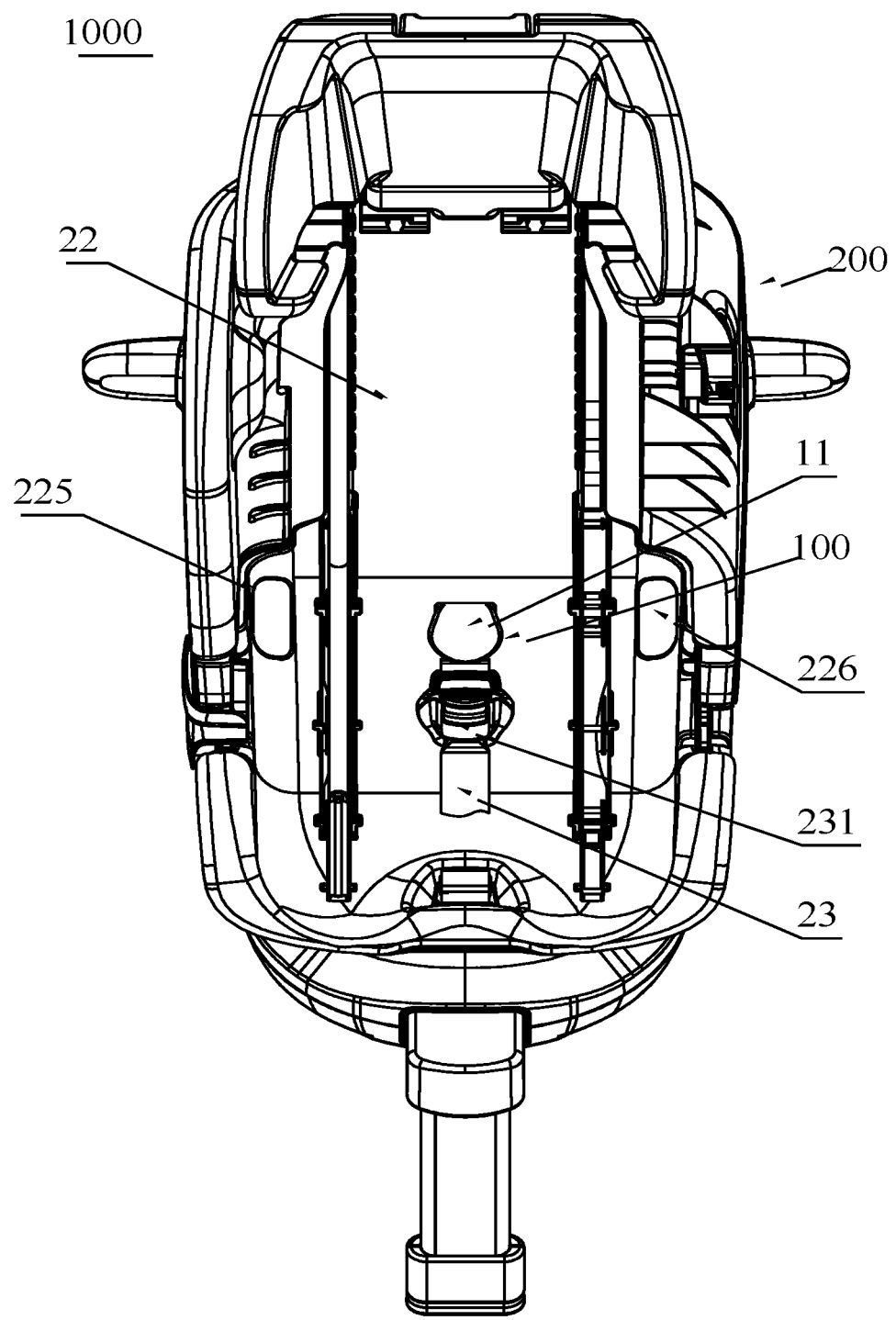
FIG. 12 schematically illustrates a front view of a child safety seat according to a sixth embodiment of the present disclosure, in which a safety belt limiting device is clamped with a crotch belt.
Figure 13:
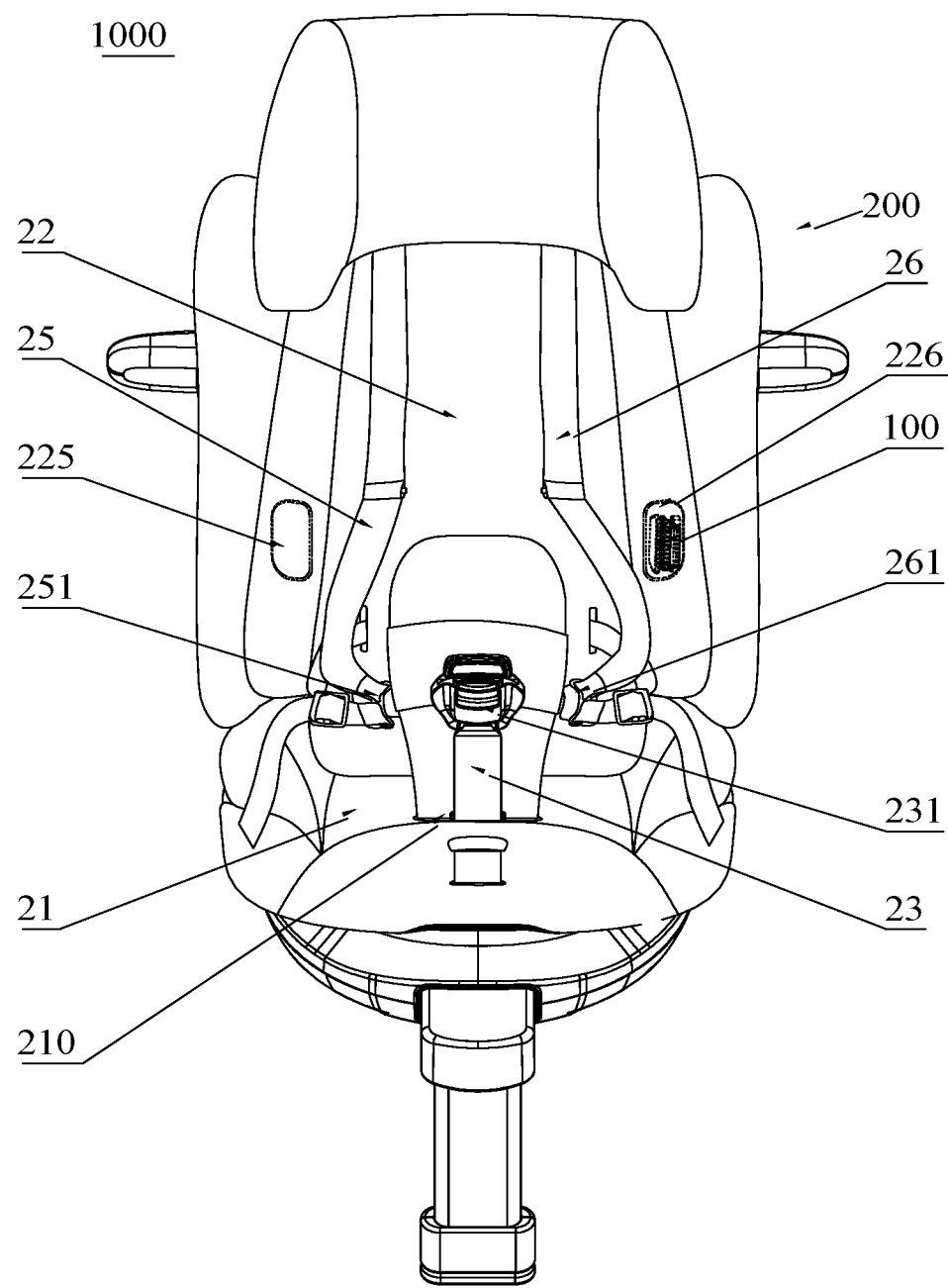
FIG. 13 schematically illustrates a front view of the child safety seat according to the sixth embodiment of the present disclosure, in which the safety belt limiting device is removed from the crotch belt and then stored in a second accommodating slot.

FIG. 12 and FIG. 13 illustrate a seat 1000 according to a sixth embodiment of the present disclosure. This embodiment is a variation of the fifth embodiment. Differences between this embodiment and the fifth embodiment will be mainly described below, and identical or similar content between this embodiment and the fifth embodiment will not be described in detail.

Referring to FIG. 12 and FIG. 13, for ease of illustration, the seat cloth is not shown in FIG. 12, but the seat cloth is shown in FIG. 13 (not labeled in the figure). The seat body 200 may be provided with a first shoulder belt (or referred to as a first child shoulder belt) 25 and a second shoulder belt (or referred to as a second child shoulder belt) 26. The first shoulder belt 25 is provided with a first sub-buckle 251. The second shoulder belt 26 is provided with a second sub-buckle 261. The first sub-buckle 251 and the second sub-buckle 261 are adapted to be detachably clamped with the first fastening device 231. Two sides of the backrest portion 22 are provided with a first accommodating slot 225 and a second accommodating slot 226. When the seat 1000 is in a first use mode, the seat 1000 secures the child through the first shoulder belt 25 and the second shoulder belt 26, and the safety belt limiting device 100 is required to be removed from the first fastening device 231. The first sub-buckle 251 and the second sub-buckle 261 are clamped with the first fastening device 231 at the same time, and the removed safety belt limiting device 100 can be accommodated in the first accommodating slot 225 or the second accommodating slot 226 to prevent loss. When the seat 1000 is in a second use mode, the seat 1000 secures the child through the vehicle-mounted safety belt. In this case, the first sub-buckle 251 and the second sub-buckle 261 are both released from the clamping with the first fastening device 231, and the safety belt limiting device 100 removed from the first accommodating slot 225 or the second accommodating slot 226 is clamped with the first fastening device 231. Then, the first sub-buckle 251 can be accommodated in the first accommodating slot 225, and the second sub-buckle 261 can be accommodated in the second accommodating slot 226. The first accommodating slot 225 and the second accommodating slot 226 may be directly covered by the seat cloth, and the first accommodating slot 225 and the second accommodating slot 226 may be exposed by lifting the seat cloth from a side.

In this embodiment, since the safety belt limiting device 100 and one of the first sub-buckle 251 and the second sub-buckle 261 are alternately stored in a same accommodating slot, a user's mis-operation in the two modes can be effectively prevented. That is, in the first use mode, before the user clamps both the first sub-buckle 251 and the second sub-buckle 261 with the first fastening device 231, the safety belt limiting device 100 is required to be first removed from the first fastening device 231 and stored in the first accommodating slot 225 or in the second accommodating slot 226. In the second use mode, the user needs to first remove the safety belt limiting device 100 from the first accommodating slot 225 or the second accommodating slot 226 and mount the safety belt limiting device 100 on the first fastening device 231, and then store the first sub-buckle 251 and the second sub-buckle 261 in the first accommodating slot 225 or in the second accommodating slot 226 respectively.

It is to be noted that the first accommodating slot 225 and the second accommodating slot 226 of this embodiment are adapted to accommodate the safety belt limiting device 100 in the fifth embodiment as well as adapted to accommodate the safety belt limiting device 100 in the fourth embodiment.

Refer to FIG. 14 to FIG. 25 which illustrate a seat 1000 according to a seventh embodiment of the present disclosure. This embodiment is a variation of the sixth embodiment. Differences between this embodiment and the sixth embodiment will be mainly described below, and identical or similar content between this embodiment and the sixth embodiment will not be described in detail.

Figure 14:
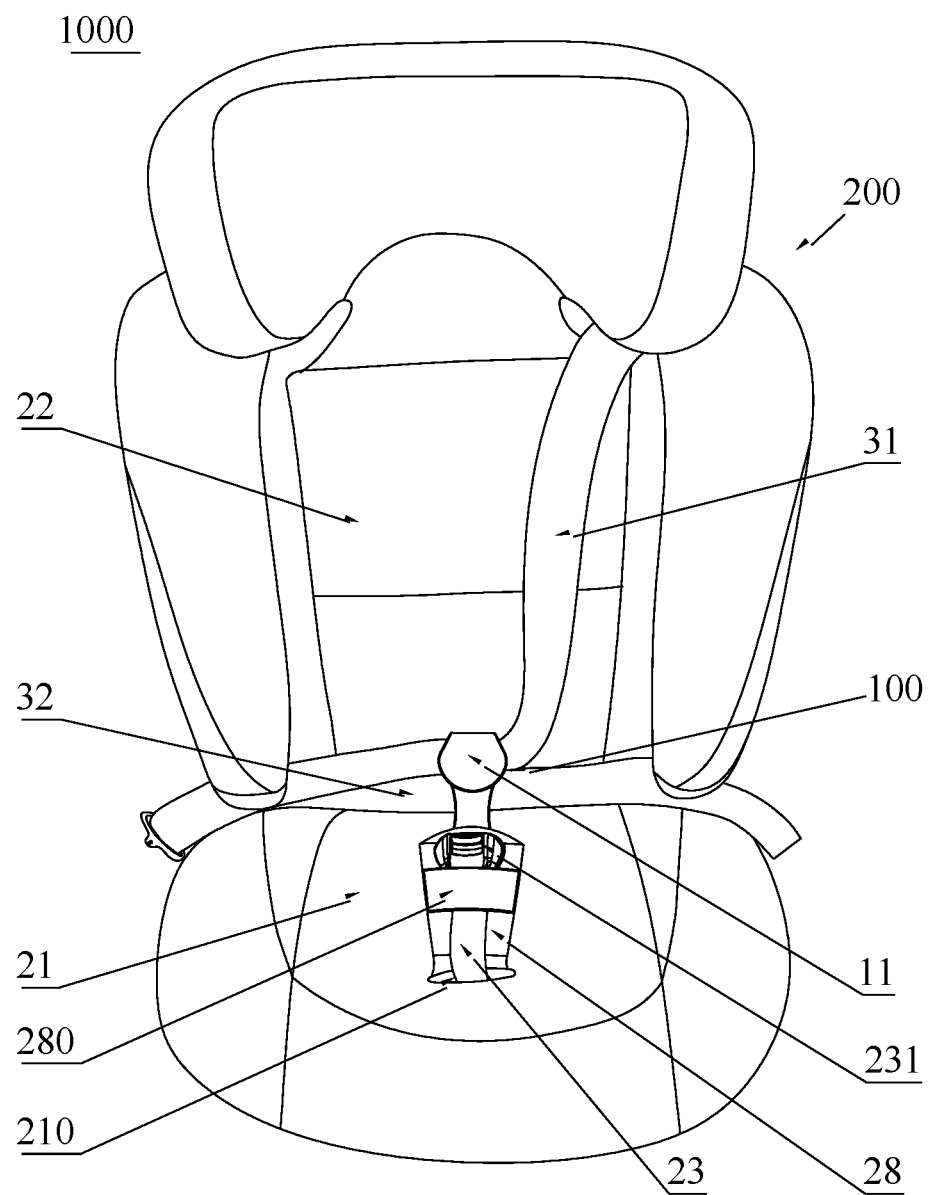
FIG. 14 schematically illustrates a front view of a child safety seat according to a seventh embodiment of the present disclosure.

Referring to FIG. 14, the seat body 200 includes a crotch belt 23 and a crotch belt guard 28 that are connected to the crotch belt mounting portion 210. An end portion of the crotch belt 23 is provided with a first fastening device 231. As described above, the first fastening device 231 is configured to be clamped with the first sub-buckle 251 of the first shoulder belt 25 and the second sub-buckle 261 of the second shoulder belt 26. The crotch belt guard 28 is closer, relative to the crotch belt 23, to the child who is seated in the safety seat, and the bottom 281 of the crotch belt guard 28 may be connected to the seat cloth on the seat body 200 by sewing, for example, and a width of the crotch belt guard 28 is greater than that of the crotch belt 23, thereby providing an enough large contact area for the child. In order to limit a left-right sliding range of the crotch belt 23 relative to the crotch belt guard 28, the crotch belt guard 28 may also be provided with a limit belt 280. Left and right ends of the limit belt 280 are connected to left and right sides of the crotch belt guard 28, and the crotch belt 23 may pass between the limit belt 280 and the crotch belt guard 28. In this embodiment, the safety belt limiting device 100 is connected to the crotch belt guard 28, and the first engagement portion 11 thereof may be, for example, a hung clasp and may hang upside down on the shoulder belt portion 31 (or hang upside down on the shoulder belt portion 31 and the waist belt portion 32 at the same time), so as to at least apply downward traction to the shoulder belt portion 31.

Figure 15:
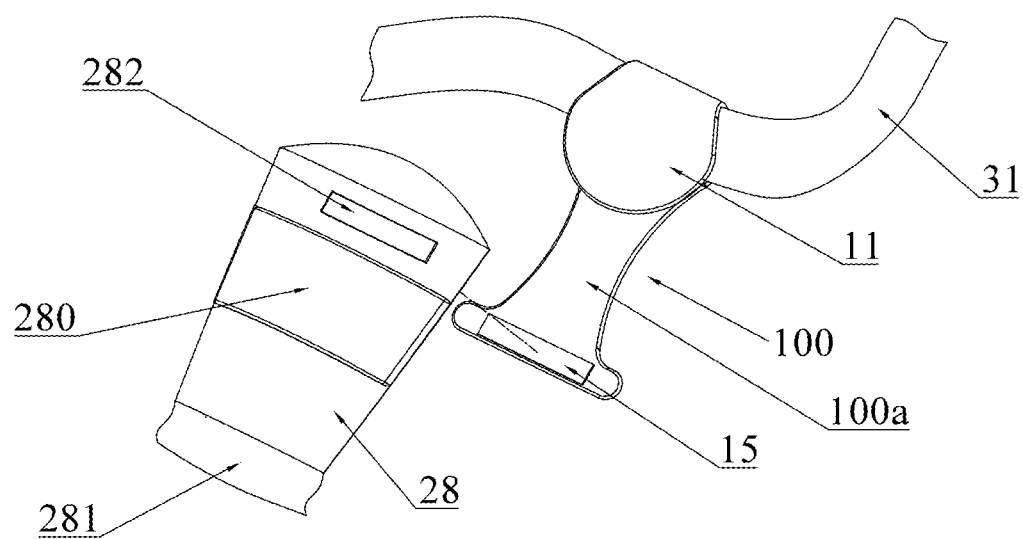
FIG. 15 schematically illustrates a perspective view of an implementation of a safety belt limiting device in the child safety seat according to the seventh embodiment of the present disclosure, in which the safety belt limiting device is separated from a crotch belt guard.
Figure 16:
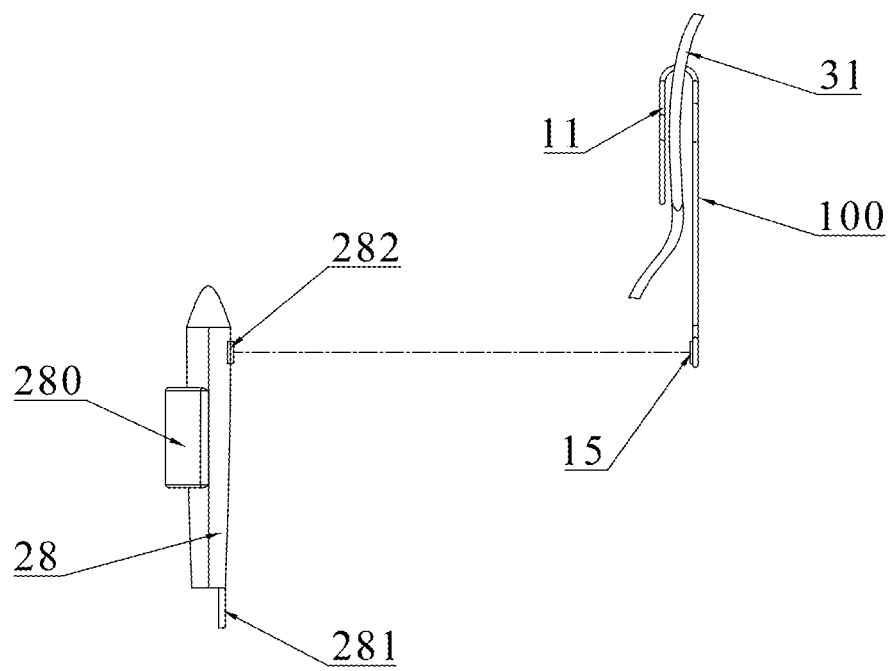
FIG. 16 schematically illustrates a side view of FIG. 15.
Figure 17:
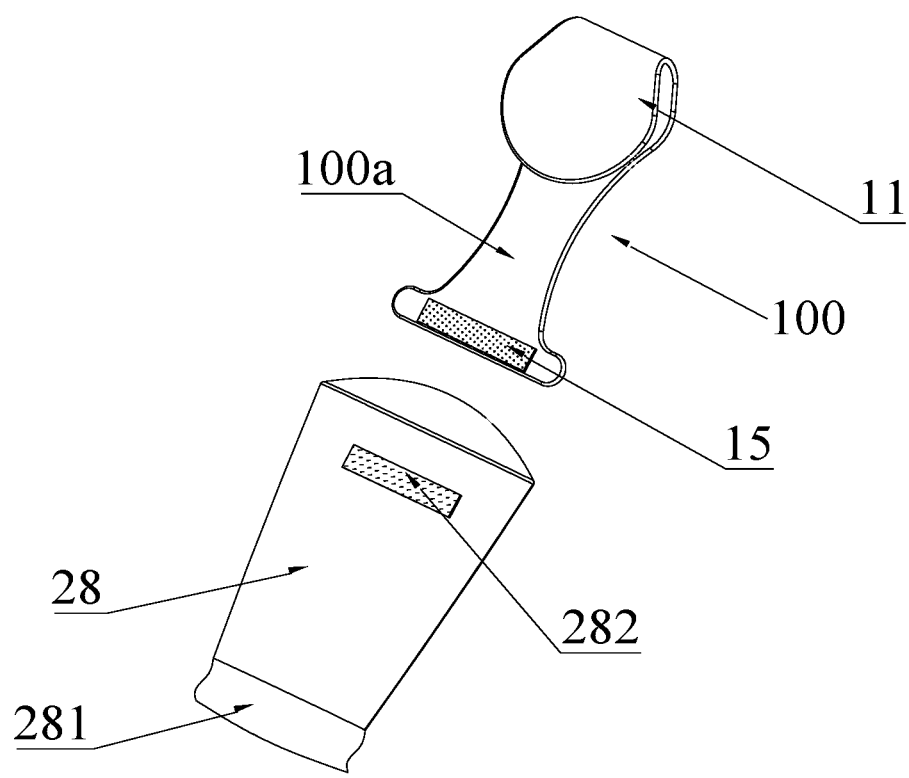
FIG. 17 schematically illustrates a perspective view of another implementation of the safety belt limiting device in the child safety seat according to the seventh embodiment of the present disclosure, in which the safety belt limiting device is separated from the crotch belt guard.
Figure 18:
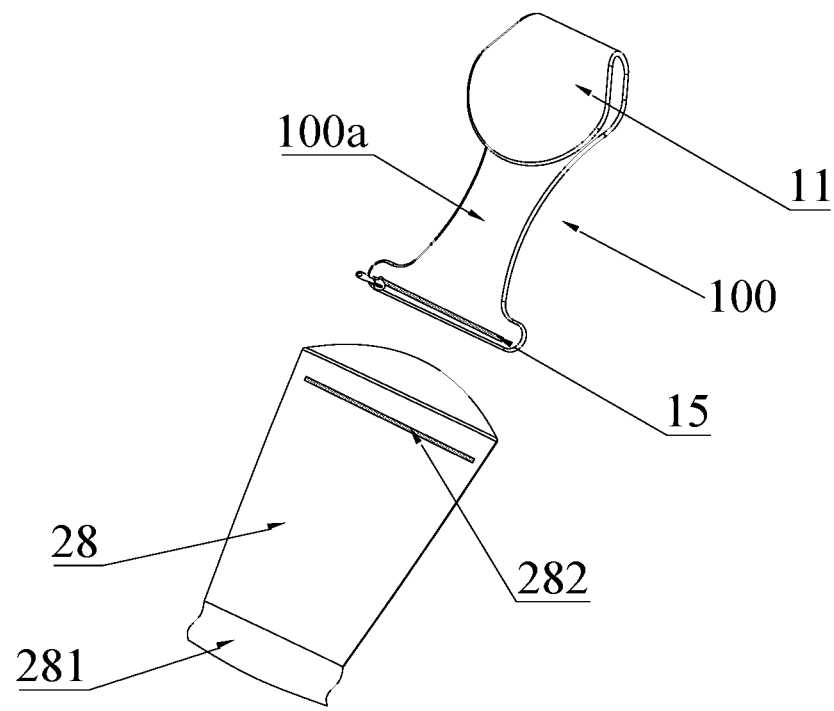
FIG. 18 schematically illustrates a perspective view of yet another implementation of the safety belt limiting device in the child safety seat according to the seventh embodiment of the present disclosure, in which the safety belt limiting device is separated from the crotch belt guard.
Figure 19:
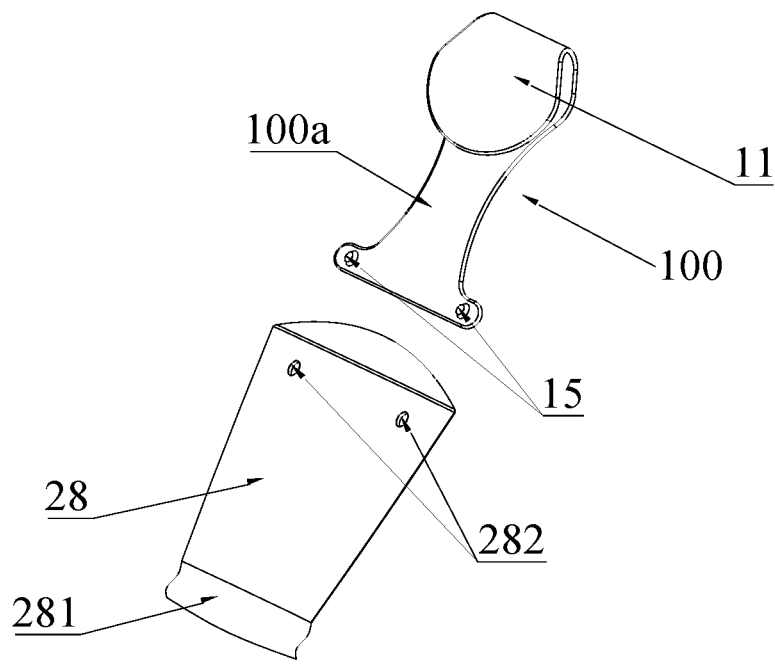
FIG. 19 schematically illustrates a perspective view of still another implementation of the safety belt limiting device in the child safety seat according to the seventh embodiment of the present disclosure, in which the safety belt limiting device is separated from the crotch belt guard.
Figure 20:
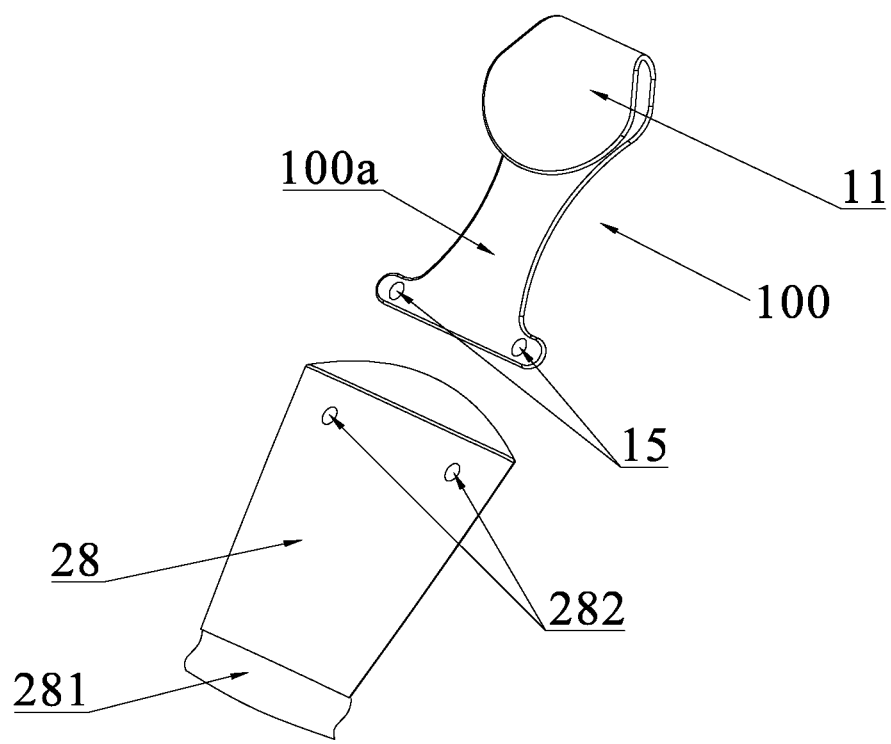
FIG. 20 schematically illustrates a perspective view of a further implementation of the safety belt limiting device in the child safety seat according to the seventh embodiment of the present disclosure, in which the safety belt limiting device is separated from the crotch belt guard.

Referring to FIG. 15 and FIG. 16, an implementation of the safety belt limiting device 100 is shown. The safety belt limiting device 100 may be an integrally formed metal member or plastic member. The first engagement portion 11 is located at the first end of the safety belt limiting device 100, and the second end of the safety belt limiting device 100 is provided with a third engagement portion 15. An upper part of the crotch belt guard 28 is provided with a connecting portion 282. The third engagement portion 15 and the connecting portion 282 may be fixed together by sewing or riveting, for example, so that the safety belt limiting device 100 is fixed to the crotch belt guard 28.

FIG. 17 to FIG. 25 illustrate many other manners in which the safety belt limiting device 100 is connected to the crotch belt guard 28. For ease of description, in FIG. 17 and FIG. 18, the crotch belt guard 28 is shown in a rear-view direction, and the safety belt limiting device 100 is shown in a front-view direction. As can be seen from the figures, the safety belt limiting device 100 may include an integrally formed main body 100a, the main body 100a may be a metal member or a plastic member, the first engagement portion 11 is located at a first end of the main body 100a and may be a hung clasp, and a second end of the main body 100a is provided with the third engagement portion 15. The crotch belt guard 28 is provided with the connecting portion 282, and the connecting portion 282 is detachably connected to the third engagement portion 15, so that the safety belt limiting device 100 is detachably connected to the crotch belt guard 28. In this way, the safety belt limiting device 100 can be removed from the crotch belt guard 28 and stored when the safety belt limiting device 100 is not required.

The connecting portion 282 may be detachably connected to the third engagement portion 15 in a variety of manners. For example, referring to FIG. 17, the connecting portion 282 is located on an upper part of a back side of the crotch belt guard 28, and the third engagement portion 15 and the connecting portion 282 may be magic tapes in coordination with each other. Alternatively, referring to FIG. 18, the third engagement portion 15 and the connecting portion 282 may be zippers in coordination with each other. Alternatively, referring to FIG. 19, the third engagement portion 15 and the connecting portion 282 may be a button and a buttonhole in coordination with each other. Alternatively, referring to FIG. 20, the third engagement portion 15 and the connecting portion 282 may be magnetic members in coordination with each other. Alternatively, in a non-shown manner, the third engagement portion 15 and the connecting portion 282 may be snap fasteners in coordination with each other. For example, the third engagement portion 15 may be arranged at the second end of the main body 100a in any suitable manner such as bonding, riveting, embedding, sewing, or overmolding.

Figure 21:
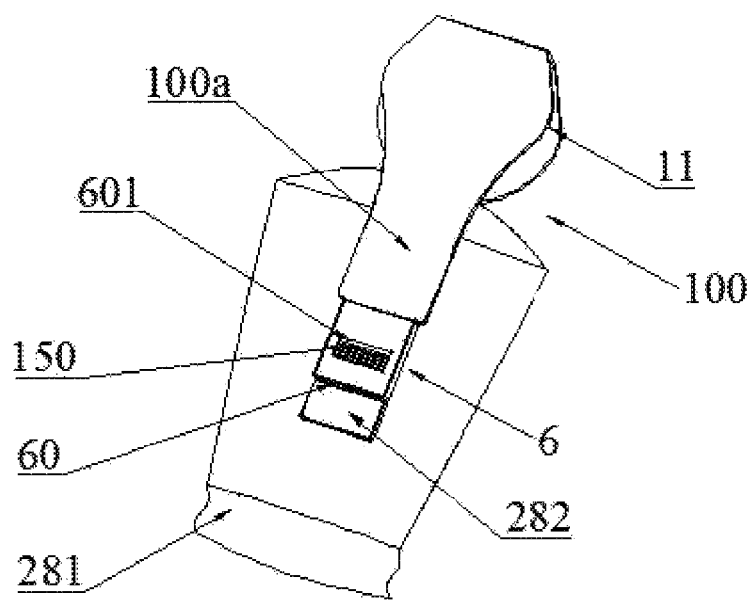
FIG. 21 schematically illustrates a rear perspective view of a further implementation of the safety belt limiting device in the child safety seat according to the seventh embodiment of the present disclosure, in which the safety belt limiting device is connected to the crotch belt guard.
Figure 22:
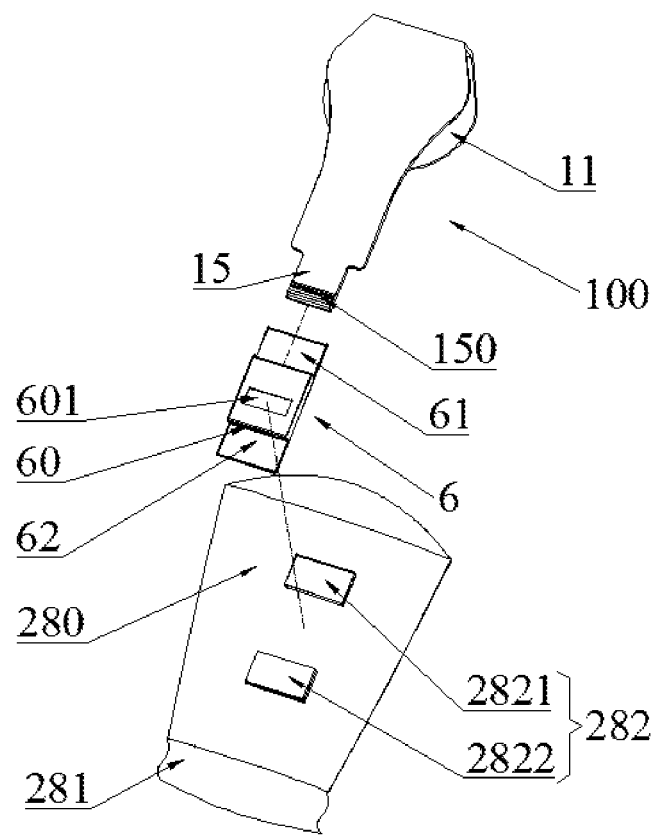
FIG. 22 schematically illustrates a perspective view in which the safety belt limiting device shown in FIG. 21 is separated from the crotch belt guard.
Figure 23:
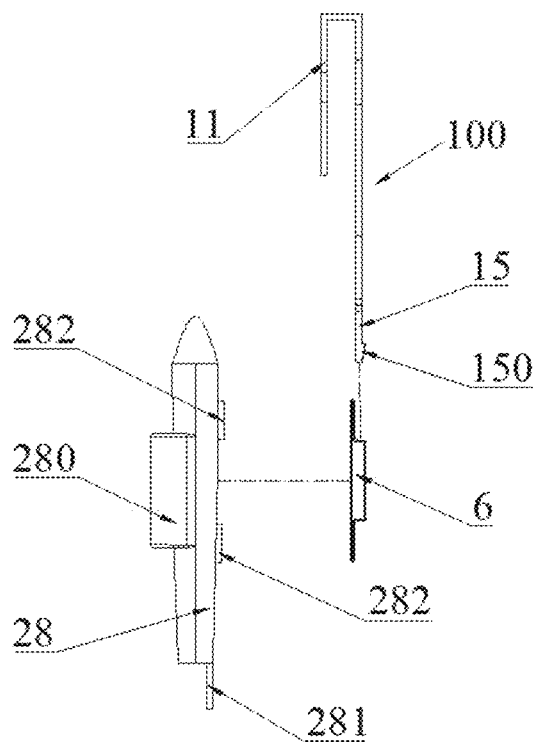
FIG. 23 schematically illustrates a side view of FIG. 22.

FIG. 21 to FIG. 23 illustrate another manner in which the safety belt limiting device 100 is detachably connected to the crotch belt guard 28. Referring to FIG. 22 and FIG. 23, the child safety seat further includes a clamping plate 6, and a side profile of the clamping plate 6 is, for example, generally T-shaped. A slot 60 is arranged in the middle of the clamping plate 6, and a clamping hole 601 is formed on a wall of the slot 60. The connecting portion 282 of the crotch belt guard 28 includes two positioning sleeves 2821 and 2822 spaced apart on a back side of the crotch belt guard 28, and two ends 61 and 62 of the clamping plate 6 are adapted to be inserted into the two positioning sleeves, so that the slot 60 is located between the two positioning sleeves 2821 and 2822. The wall of the slot 60 may protrude outward relative to the two positioning sleeves 2821 and 2822. The third engagement portion 15 at the second end of the main body 100a may include an elastic arm and a fixture block 150 arranged on the elastic arm. The elastic arm is adapted to be inserted into the slot 60, and the fixture block 150 is adapted to be clamped with the clamping hole 601. Preferably, the elastic arm and the fixture block 150 are integrally formed with the main body 100a.

Figure 24:
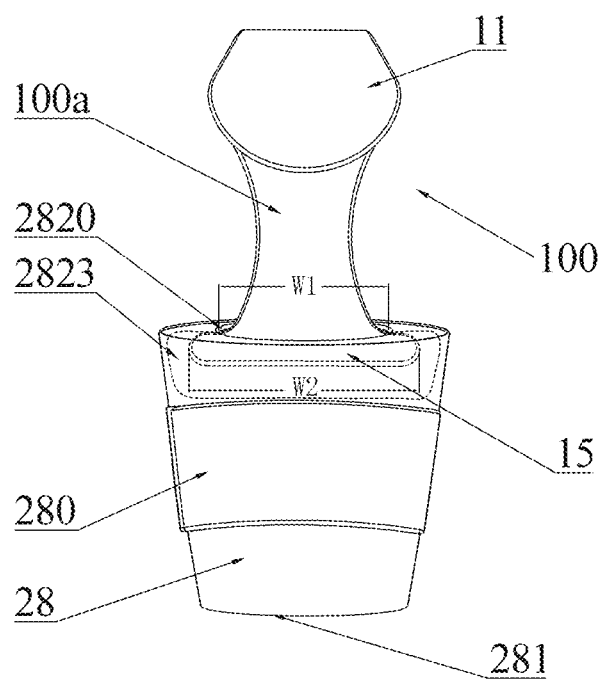
FIG. 24 schematically illustrates a perspective view of a further implementation of the safety belt limiting device in the child safety seat according to the seventh embodiment of the present disclosure, in which the safety belt limiting device is connected to the crotch belt guard.
Figure 25:
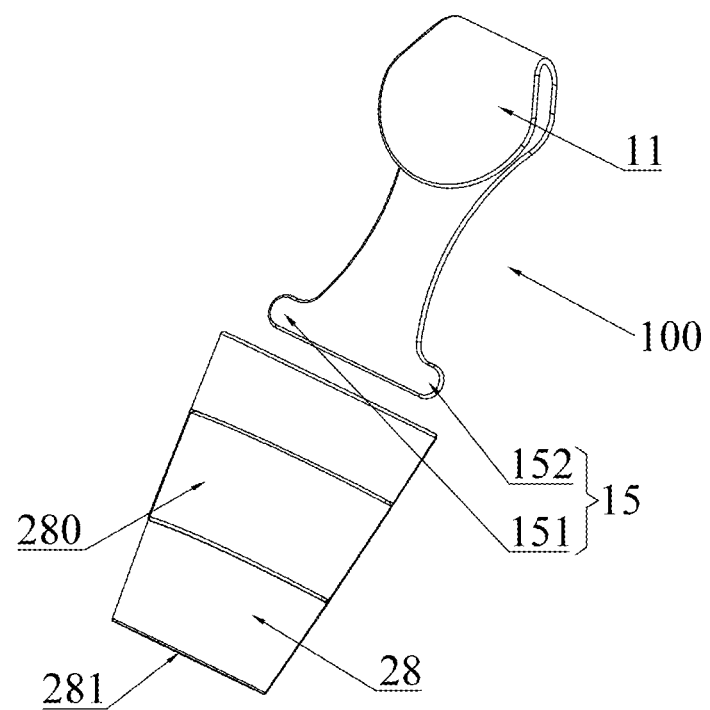
FIG. 25 schematically illustrates a perspective view in which the safety belt limiting device shown in FIG. 24 is separated from the crotch belt guard.

FIG. 24 and FIG. 25 illustrate yet another manner in which the safety belt limiting device 100 is detachably connected to the crotch belt guard 28. The connecting portion 282 of the crotch belt guard 28 includes an accommodating recess 2823 inside the crotch belt guard 28, and the accommodating recess 2823 is provided with a top opening 2820. The third engagement portion 15 at the second end of the main body 100a includes two lugs 151 and 152 extending laterally from the main body 100a in opposite directions, widths W2 of the two lugs 151 and 152 are greater than a width W1 of the top opening, and the two lugs 151 and 152 are adapted to obliquely enter the accommodating recess 2823 through the top opening 2820. When the two lugs 151 and 152 enter the accommodating recess 2823 and then are put right, it is not easy for the safety belt limiting device 100 to fall off from the crotch belt guard 28. Preferably, the two lugs 151 and 152 are integrally formed with the main body 100a.

An embodiment of the present disclosure further provides a safety belt limiting device 100. The safety belt limiting device 100 is attached to a seat body 200 of a child safety seat, and the safety belt limiting device 100 includes a first engagement portion 11. The safety belt limiting device 100 is adapted to detachably engage with a shoulder belt portion 31 of a vehicle-mounted safety belt through the first engagement portion 11, so as to apply downward traction to the shoulder belt portion 31, so that the shoulder belt portion 31 is close to a waist belt portion 32 of the vehicle-mounted safety belt, thereby preventing injuries to the child due to upper slippage of the shoulder belt portion 31. In some embodiments, the safety belt limiting device 100 may detachably engage simultaneously with the shoulder belt portion 31 and the waist belt portion 32 of the vehicle-mounted safety belt through the first engagement portion 11, so as to apply downward traction to the shoulder belt portion 31 and the waist belt portion 32 at the same time.

The safety belt limiting device 100 may include a first traction belt (traction belt) 41 as described in the first embodiment. The first engagement portion 11 is connected to one end of the first traction belt 41, and the other end of the first traction belt 41 may be fixedly or detachably connected to the side portion of the seat body 200. When the first traction belt 41 is detachably connected to the side portion of the seat body 200, the other end of the first traction belt 41 may be provided with a second engagement portion 12. The second engagement portion 12 is configured to be detachably connected to a connecting member 5 on the side portion 202 of the seat body 200. One or two connecting members 5 may be arranged on the side portion 202 of the seat body 200 as required. When two connecting members 5 are arranged, the two connecting members 5 may be arranged on the side portions on the two sides of the seat body 200. Preferably, the first engagement portion 11 may be a hung clasp or an annular sleeve.

The safety belt limiting device 100 may include a second traction belt (traction belt) 42 as described in the second embodiment. The first engagement portion 11 is connected to one end of the second traction belt 42, and the other end of the second traction belt 42 may be fixedly connected to the side portion of the seat body 200. One or two safety belt limiting devices 100 may be configured as required. When two safety belt limiting devices 100 are configured, the second traction belts 42 of the two safety belt limiting devices 100 are connected to the side portions on the two sides of the seat body 200 respectively. Preferably, the first engagement portion 11 may be a hung clasp or an annular sleeve.

The safety belt limiting device 100 may include a third traction belt (traction belt) 43 as described in the third embodiment. The first engagement portion 11 is connected to one end of the third traction belt 43, and the other end of the third traction belt 43 may be connected to a crotch belt mounting portion 210 on a seat portion 21 of the child safety seat by sewing, for example. Certainly, in some embodiments, the other end of the third traction belt 43 may be detachably connected to the crotch belt mounting portion 210. Preferably, the first engagement portion 11 may be a hung clasp or an annular sleeve.

The safety belt limiting device 100 may include a fourth traction belt (traction belt) 44 as described in the fourth embodiment. The first engagement portion 11 is connected to the fourth traction belt 44, the fourth traction belt 44 is further provided with a second fastening device 442, and the second fastening device 442 is configured to be detachably connected to a first fastening device 231 on a crotch belt 23 of the child safety seat. Preferably, the first engagement portion 11 may be a hung clasp or an annular sleeve.

Preferably, the above traction belts (the first traction belt 41, the second traction belt 42, the third traction belt 43, and the fourth traction belt 44) have adjustable lengths. Preferably, when the child is seated in the child safety seat, and the vehicle-mounted safety belt and the safety belt limiting device 100 are in use, the first engagement portion 11 engages with the shoulder belt portion 31, the traction belts (the first traction belt 41, the second traction belt 42, the third traction belt 43, and the fourth traction belt 44) are tensioned, and the shoulder belt portion 31 of the vehicle-mounted safety belt is pulled downwards. An upper angle (refer to the upper angle α in FIG. 1) is formed between an upper part of the shoulder belt portion 31 and each of the traction belts. The upper angle may range, for example, from 60° to 120°. The upper angle may be equal to 60° or equal to 120°. Preferably, the upper angle is 90°.

The safety belt limiting device 100 may be an integrally formed member as described in the fifth embodiment. The first engagement portion 11 is located at a first end of the safety belt limiting device 100. The first engagement portion 11 is, for example, a hung clasp. A second end of the safety belt limiting device 100 is provided with a third fastening device 14. The third fastening device 14 is configured to be detachably connected to the first fastening device 231 on the crotch belt 23 of the child safety seat.

The safety belt limiting device 100 may include an integrally formed main body 100a as described in the seventh embodiment. The main body 100a may be a metal member or a plastic member. The first engagement portion 11 is located at a first end of the main body 100a. The first engagement portion 11 may be a hung clasp or an annular sleeve. Preferably, the first engagement portion 11 is integrally formed with the main body 100a and is a hung clasp. A second end of the main body 100a is provided with a third engagement portion 15. The third engagement portion 15 may have a variety of implementations, which may be integrally formed with the main body 100a or be arranged on the main body 100a in any suitable manners. The third engagement portion 15 is configured for connection with the crotch belt guard 28. For example, the third engagement portion 15 may be a magic tape. For example, the third engagement portion 15 may be a zipper. For example, the third engagement portion 15 may be a magnetic member. For example, the third engagement portion 15 may be a snap fastener. For example, the third engagement portion 15 may be a button. Alternatively, the third engagement portion 15 may include an elastic arm and a fixture block 150 arranged on the elastic arm. Alternatively, the third engagement portion 15 may include two lugs 151 and 152 extending laterally from the main body in opposite directions.

The safety belt limiting device 100 is configured to be attached to the seat body 200, and at least applies downward traction to the shoulder belt portion 31 of the vehicle-mounted safety belt, so that the shoulder belt portion 31 is close to the waist belt portion 32, which can effectively prevent upward movement of the shoulder belt portion 31 when the vehicle is impacted, thereby effectively preventing injuries to the child's neck and face caused by the shoulder belt portion 31 and improving the child's riding safety.

The technical features in the above embodiments may be randomly combined. For concise description, not all possible combinations of the technical features in the above embodiments are described. However, all the combinations of the technical features are to be considered as falling within the scope described in this specification provided that they do not conflict with each other.

The above embodiments only describe several implementations of the present disclosure, and their description is specific and detailed, but cannot therefore be understood as a limitation on the patent scope of the disclosure. It should be noted that those of ordinary skill in the art may further make variations and improvements without departing from the conception of the present disclosure, and these all fall within the protection scope of the present disclosure. Therefore, the patent protection scope of the present disclosure should be subject to the appended claims.

What is claimed is:

1. A child safety seat, comprising:
a seat body; and
a safety belt limiting device configured to be attached to the seat body,
wherein the safety belt limiting device includes a first engagement portion, and the safety belt limiting device is adapted to detachably engage with a shoulder belt portion of a vehicle-mounted safety belt through the first engagement portion, so as to apply downward traction to the shoulder belt portion,
wherein the safety belt limiting device includes a traction belt connected to the first engagement portion, the traction belt being provided with a second engagement portion,
wherein the seat body is provided with a connecting member configured to be detachably connected to the second engagement portion, and
wherein the seat body is provided with a storage bag configured to store, when the connecting member is separated from the second engagement portion, the connecting member, so that the connecting member is hidden in the storage bag.

2. The child safety seat of claim 1, wherein the first engagement portion is a hung clasp or an annular sleeve.

3. The child safety seat of claim 1, wherein the connecting member is arranged on a side portion of the seat body and the seat body includes a seat portion and a backrest portion and wherein the side portion of the seat body includes a side portion of the seat portion and a side portion of the backrest portion.

4. The child safety seat of claim 1, wherein one of the second engagement portion and the connecting member is a male connector and the other of the second engagement portion and the connecting member is a female connector.

5. The child safety seat of claim 1, wherein two sides of the seat body are provided with the connecting member and the second engagement portion is selectively detachably connected to the connecting member on one of the two sides.

6. The child safety seat of claim 1, wherein when the safety belt limiting device is in use, the first engagement portion engages with the shoulder belt portion, and the traction belt is tensioned and wherein an upper angle is formed between an upper part of the shoulder belt portion of the vehicle-mounted safety belt and the traction belt, the upper angle ranging from 60° to 120°.

7. The child safety seat of claim 1, wherein the connecting member is mounted on a backrest portion of the seat body through a webbing.

8. The child safety seat of claim 1, wherein a length of the traction belt between the first engagement portion and the second engagement portion is adjustable.

9. The child safety seat of claim 2, wherein the first engagement portion is provided with a through hole, and a first end of the traction belt passes through the through hole and forms an annular structure.

10. The child safety seat of claim 3, wherein the connecting member is arranged at a bottom of the side portion of the backrest portion, or is arranged on an inner or outer side face of the side portion of the backrest portion.

11. The child safety seat of claim 3, wherein the connecting member is close to an opening of the side portion of the backrest portion for a waist belt portion of the vehicle-mounted safety belt to pass through.

12. The child safety seat of claim 3, wherein the connecting member is at a junction between the side portion of the seat portion and the side portion of the backrest portion.

13. The child safety seat of claim 1, wherein the storage bag is a cloth bag or an elastic sleeve connected to seat cloth of the seat body.

* * * * *